(12) United States Patent
Hong

(10) Patent No.: US 12,420,437 B2
(45) Date of Patent: Sep. 23, 2025

(54) ROBOT FOR GRIPPING AN OBJECT USING DUAL FINGERS AND OBJECT GRIP METHOD THEREOF

(71) Applicant: SAMSUNG ELECTRONICS CO., LTD., Suwon-si (KR)

(72) Inventor: Hyunseok Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 125 days.

(21) Appl. No.: 18/525,111

(22) Filed: Nov. 30, 2023

(65) Prior Publication Data
US 2024/0165830 A1 May 23, 2024

Related U.S. Application Data

(63) Continuation of application No. PCT/KR2023/014475, filed on Sep. 22, 2023.

(30) Foreign Application Priority Data

Nov. 22, 2022 (KR) ........................ 10-2022-0157631

(51) Int. Cl.
*B25J 9/16* (2006.01)
*B25J 15/08* (2006.01)

(52) U.S. Cl.
CPC ............. *B25J 15/08* (2013.01); *B25J 9/1697* (2013.01)

(58) Field of Classification Search
USPC ................................................ 700/245–264
See application file for complete search history.

(56) References Cited

U.S. PATENT DOCUMENTS

| | | |
|---|---|---|
| 6,606,540 B1 | 8/2003 | Gross |
| 7,043,335 B2 * | 5/2006 | Yoshida ................ H01L 21/681 |
| | | 700/62 |

(Continued)

FOREIGN PATENT DOCUMENTS

| | | | | |
|---|---|---|---|---|
| GB | 2521429 A | * | 6/2015 | ........... G06T 1/0014 |
| JP | 2004-327501 A | | 11/2004 | |

(Continued)

OTHER PUBLICATIONS

International Search Report (PCT/ISA/210) issued Jan. 12, 2024 by the International Searching Authority in International Patent Application No. PCT/KR2023/014475.

(Continued)

*Primary Examiner* — Jonathan L Sample
(74) *Attorney, Agent, or Firm* — Sughrue Mion, PLLC

(57) ABSTRACT

A robot and a method of controlling same is provided, the robot including: first and second fingers, where finger comprises: a contact part; a light emitter configured to radiate light toward the contact part; a camera configured to capture an image of the respective contact part; and a polarization filter between the light emitter and the contact part, wherein the polarization filters are configured to pass light polarized in a first or second direction based on a voltage applied, and wherein the first and second directions are perpendicular to one another; a driver configured to move the first finger and the second finger; and at least one processor connected with the components of the first and second fingers and the driver, wherein the at least one processor is configured to: obtain images via the first and second cameras by controlling an activation state of at least one of the light emitters and the polarization filters, and based on identifying the presence of an object positioned between the contact parts, cause the (Continued)

fingers to grip the object and to maintain within a pre-set range a difference between first and second distances.

20 Claims, 17 Drawing Sheets

(56) References Cited

U.S. PATENT DOCUMENTS

| | | | |
|---|---|---|---|
| 7,420,155 B2 | 9/2008 | Mizota et al. | |
| 8,260,458 B2* | 9/2012 | Kim | B25J 13/081 |
| | | | 294/213 |
| 9,014,587 B2 | 4/2015 | Ota et al. | |
| 9,333,648 B2 | 5/2016 | Kim et al. | |
| 10,038,854 B1* | 7/2018 | Cooper | H10F 39/12 |
| 10,682,774 B2* | 6/2020 | Bingham | B25J 15/0004 |
| 10,967,507 B2* | 4/2021 | Homberg | B25J 9/1612 |
| 11,592,556 B2 | 2/2023 | Mori et al. | |
| 2013/0184870 A1* | 7/2013 | Ota | B25J 9/1669 |
| | | | 700/262 |
| 2017/0021498 A1* | 1/2017 | Morey | B25J 9/1612 |
| 2017/0252930 A1 | 9/2017 | Birglen | |
| 2017/0274539 A1* | 9/2017 | Maeda | B25J 15/10 |
| 2017/0320216 A1* | 11/2017 | Strauss | B25J 15/0028 |
| 2019/0047156 A1* | 2/2019 | Curhan | B25J 15/12 |
| 2019/0266979 A1 | 8/2019 | Wurmfeld | |
| 2019/0337152 A1* | 11/2019 | Homberg | B25J 9/1697 |
| 2019/0383939 A1 | 12/2019 | Mori et al. | |
| 2020/0391378 A1* | 12/2020 | Bingham | B25J 9/161 |
| 2021/0023714 A1* | 1/2021 | Zhang | H04N 13/254 |
| 2021/0299879 A1* | 9/2021 | Pinter | B25J 9/1697 |
| 2021/0394367 A1* | 12/2021 | Correll | B25J 9/1664 |
| 2023/0191617 A1 | 6/2023 | Kim et al. | |
| 2023/0294306 A1* | 9/2023 | Nicholas | B25J 13/084 |
| | | | 294/86.4 |

FOREIGN PATENT DOCUMENTS

| | | | | |
|---|---|---|---|---|
| JP | 6039434 B2 | 12/2016 | | |
| KR | 10-1091783 B1 | 12/2011 | | |
| KR | 10-2014-0037741 A | 3/2014 | | |
| KR | 10-2235227 B1 | 4/2021 | | |
| KR | 10-2022-0011464 A | 1/2022 | | |
| WO | WO-2011099404 A1 * | 8/2011 | | B25J 9/1697 |
| WO | 2013/039302 A2 | 3/2013 | | |
| WO | 2022/025893 A1 | 2/2022 | | |

OTHER PUBLICATIONS

Written Opinion (PCT/ISA/237) issued Jan. 12, 2024 by the International Searching Authority in International Patent Application No. PCT/KR2023/014475.

* cited by examiner

ROBOT FOR GRIPPING AN OBJECT USING DUAL FINGERS AND OBJECT GRIP METHOD THEREOF

CROSS-REFERENCE TO RELATED APPLICATIONS

This application is a by-pass continuation of International Application No. PCT/KR2023/014475, filed on Sep. 22, 2023, which is based on and claims priority to Korean Patent Application No. 10-2022-0157631, filed on Nov. 22, 2022, in the Korean Intellectual Property Office, the disclosures of which are incorporated by reference herein in their entireties.

BACKGROUND

1. Field

The disclosure relates to a robot and an object grip method thereof, and more particularly, to a robot that grips an object using dual fingers and an object grip method thereof.

2. Description of the Related Art

Electronic apparatuses of various types are being developed with developments in electronic technology. Specifically, robots in a form similar to a person are being developed recently, and there have been various attempts to make robots similar to a person in not only form, but also in function.

For example, various technologies for allowing a robot hand to also detect tactile information felt from fingers of a person when grasping an object are being developed.

SUMMARY

According to an aspect of the disclosure, a robot includes: a first finger comprising: a first contact part: a first light emitter configured to radiate light toward the first contact part: a first camera configured to capture an image in a direction corresponding to a location of the first contact part: and a first polarization filter between the first light emitter and the first contact part, wherein the first polarization filter is configured to pass light polarized in a first direction, from among the light radiated by the first light emitter, to the first contact part based on a voltage applied to the first polarization filter; a second finger comprising: a second contact part: a second light emitter configured to radiate light toward the second contact part; a second camera configured to capture an image in a direction corresponding to a location of the second contact part: and a second polarization filter interposed between the second light emitter and the second contact part, wherein the second polarization filter is configured to pass light polarized in a second direction, from among the light radiated by the second light emitter, to the second contact part based on a voltage applied to the second polarization filter, and wherein the second direction is perpendicular to the first direction: a driver configured to cause the first finger and the second finger to move; and at least one processor operatively connected with the first light emitter, the first camera, the first polarization filter, the second light emitter, the second camera, the second polarization filter, and the driver, wherein the at least one processor is configured to: obtain a first image through the first camera and a second image through the second camera by controlling an activation state of at least one of the first light emitter, the second light emitter, the first polarization filter, and the second polarization filter, and based on identifying the presence of an object positioned between the first contact part and the second contact part based on the first image and the second image, control the driver to cause the first finger and the second finger to grip the object and to maintain within a pre-set range, based on the first image and the second image, a difference between a first distance and a second distance, and wherein the first distance is a distance between the first contact part and the object and the second distance is a distance between the second contact part and the object.

The first contact part may include a first gel including a first plurality of markers and a first coating layer formed on the first gel, and the second contact part may include a second gel including a second plurality of markers and a second coating layer formed on the second gel.

The first coating layer and the second coating layer may be transparent or semi-transparent.

The at least one processor of the robot may be further configured to: identify whether the first light emitter and the second light emitter are deactivated, and based on identifying that the first light emitter and the second light emitter are not deactivated, deactivate the first light emitter and the second light emitter, identify whether the first polarization filter and the second polarization filter are activated, and based on identifying that the first polarization filter and the second polarization filter are not activated, activate the first polarization filter and the second polarization filter, and based on identifying the presence of the object positioned between the first contact part and the second contact part based on the first image and the second image, identify the first distance based on the first image, identify the second distance based on the second image, and control the driver to cause the first finger and the second finger to grip the object based on the first distance and the second distance.

The first contact part may include a first plurality of markers and the second contact part may include a second plurality of markers, and the at least one processor of the robot may be further configured to: based on the first light emitter and the second light emitter being deactivated, activate the first light emitter and the second light emitter, identify whether the object has been contacted by the first contact part based on a position of the first plurality of markers in the first image, and identify whether the object has been contacted by the second contact part based on a position of the second plurality of markers in the second image.

The at least one processor of the robot may be further configured to: based on the first distance and the second distance being less than or equal to a pre-set distance, deactivate the first light emitter and the second light emitter for a first time period, and activate the first light emitter and the second light emitter for a second time period which is longer than the first time period.

The at least one processor of the robot may be further configured to, based on not identifying the presence of the object positioned between the first contact part and the second contact part based on the first image and the second image: activate the second light emitter and deactivate the first polarization filter and the second polarization filter, and based on identifying the presence of the object based on the first image while the second light emitter is activated and the first polarization filter and the second polarization filter are deactivated, identify the first distance based on the first image, activate the first light emitter and deactivate the second light emitter, and based on identifying the presence of the object based on the second image while the first light emitter is activated, the second light emitter is deactivated and the first polarization filter and the second polarization filter are deactivated, identify the second distance based on the second image, and control the driver to cause the first finger and the second finger to grip the object based on the first distance and the second distance.

The first contact part may include a first plurality of markers and the second contact part may include a second plurality of markers, and the at least one processor of the robot may be further configured to: obtain the first image through the first camera while the first light emitter is activated and the second light emitter is deactivated, and identify whether the object has been contacted by the first contact part based on a position of the first plurality of markers in the first image, and obtain the second image through the second camera while the first light emitter is deactivated and the first light emitter is activated, and identify whether the object has been contacted by the second contact part based on a position of the second plurality of markers in the second image.

According to an aspect of the disclosure, a method of controlling a robot including a first finger and a second finger includes: obtaining a first image through a first camera of the first finger and a second image through a second camera of the second finger by controlling an activation state of at least one of a first light emitter of the first finger, a first polarization filter of the first finger, a second light emitter of the second finger, and a second polarization filter of the second finger, and based on identifying the presence of an object positioned between a first contact part of the first finger and a second contact part of the second finger based on the first image and the second image, causing the first finger and the second finger to move toward a location at which the object is positioned while maintaining a difference between a first distance and a second distance within a pre-set range based on the first image and the second image, wherein the first distance is a distance between the first contact part and the object and the second distance is a distance between the second contact part and the object.

The obtaining may further include: identifying whether the first light emitter and the second light emitter are deactivated, and based on identifying that the first light emitter and the second light emitter are not deactivated, deactivating the first light emitter and the second light emitter, identifying whether the first polarization filter and the second polarization filter are activated, and based on identifying that the first polarization filter and the second polarization filter are not activated, activating the first polarization filter and the second polarization filter, and the causing the first finger and the second finger to move may further include: based on identifying the presence of the object positioned between the first contact part and the second contact part based on the first image and the second image, identifying the first distance based on the first image, identifying the second distance based on the second image, and causing the first finger and the second finger to move based on the first distance and the second distance.

The obtaining may further include: based on the first light emitter and the second light emitter being deactivated, activating the first light emitter and the second light emitter, and the causing the first finger and the second finger to move may further include: identifying whether the object has been contacted by the first contact part based on a position in the first image of a first plurality of markers on the first contact part, and identifying whether the object has been contacted by the second contact part based on a position in the second image of a second plurality of markers on the second contact part.

The obtaining may further include: based on the first distance and the second distance being less than or equal to a pre-set distance, deactivating the first light emitter and the second light emitter for a first time period, and activating the first light emitter and the second light emitter for a second time period which is longer than the first time period.

Based on not identifying the presence of the object positioned between the first contact part and the second contact part based on the first image and the second image, the obtaining may further include: activating the second light emitter and deactivating the first polarization filter and the second polarization filter, and based on identifying the presence of the object based on the first image while the second light emitter is activated and the first polarization filter and the second polarization filter are deactivated, identifying the first distance based on the first image; and activating the first light emitter and deactivating the second light emitter, and based on identifying the presence of the object based on the second image while the first light emitter is activated, the second light emitter is deactivated and the first polarization filter and the second polarization filter are deactivated, identifying the second distance based on the second image, and the causing the first finger and the second finger to move may further include moving the first finger and the second finger based on the first distance and the second distance.

The obtaining may further include: obtaining the first image through the first camera while the first light emitter is activated and the second light emitter is deactivated, and identifying whether the object has been contacted by the first contact part based on a position in the first image of a first plurality of markers on the first contact part, and obtaining the second image through the second camera while the first light emitter is deactivated and the first light emitter is activated, and identifying whether the object has been contacted by the second contact part based on a position in the second image of a second plurality of markers on the second contact part.

According to an aspect of the disclosure, a non-transitory computer readable medium includes instructions stored therein, which when executed by at least one processor cause the at least one processor to execute a method of controlling a robot comprising a first finger and a second finger, where the method includes: obtaining a first image through a first camera of the first finger and a second image through a second camera of the second finger by controlling an activation state of at least one of a first light emitter of the first finger, a first polarization filter of the first finger, a second light emitter of the second finger, and a second polarization filter of the second finger, and based on identifying the presence of an object positioned between a first contact part of the first finger and a second contact part of the second finger based on the first image and the second image, causing the first finger and the second finger to move toward a location at which the object is positioned while maintaining a difference between a first distance and a second distance within a pre-set range based on the first image and the second image, wherein the first distance is a distance between the first contact part and the object and the second distance is a distance between the second contact part and the object.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
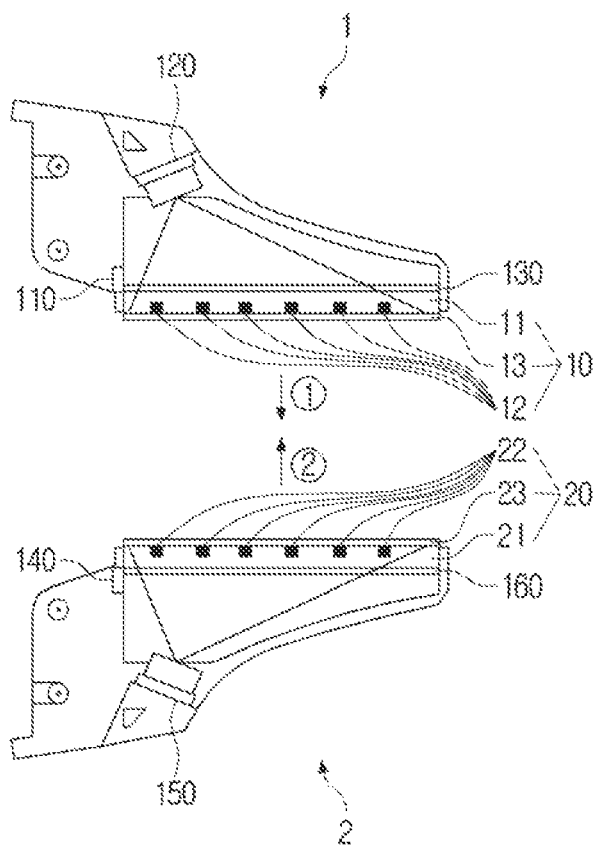
FIG. 1A is a diagram illustrating an embodiment of a first finger and a second finger provided in a robot according to one or more embodiments.

Terms used in the disclosure will be briefly described, and the disclosure will be described in detail.

The terms used in describing one or more embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in the corresponding description. Accordingly, the terms used herein are not to be understood simply as its designation but based on the meaning of the term and the overall context of the disclosure.

In the disclosure, expressions such as "have," "may have," "include," "may include," or the like are used to designate a presence of a corresponding feature (e.g., elements such as numerical value, function, operation, or component), and not to preclude a presence or a possibility of additional features.

In the disclosure, expressions such as "A or B," "at least one of A and/or B," or "one or more of A and/or B" may include all possible combinations of the items listed together. For example, "A or B," "at least one of A and B," or "at least one of A or B" may refer to all cases including (1) at least one A, (2) at least one B, or (3) both of at least one A and at least one B.

Expressions such as "first," "second," "1st," "2nd," and so on used herein may be used to refer to various elements regardless of order and/or importance. Further, it should be noted that the expressions are merely used to distinguish an element from another element and not to limit the relevant elements.

When a certain element (e.g., first element) is indicated as being "(operatively or communicatively) coupled with/to" or "connected to" another element (e.g., second element), it may be understood as the certain element being directly coupled with/to the another element or as being coupled through other element (e.g., third element).

The expression "configured to . . . (or set up to)" used in the disclosure may be used interchangeably with, for example, "suitable for . . . ," "having the capacity to . . . ," "designed to . . . ," "adapted to . . . ," "made to . . . ," or "capable of . . . " based on circumstance. The term "configured to . . . (or set up to)" may not necessarily mean "specifically designed to" in terms of hardware.

In a certain circumstance, the expression "a device configured to . . . " may mean something that the device "may perform . . . " together with another device or components. For example, the phrase "a processor configured to (or set up to) perform A, B, or C" may mean a dedicated processor for performing a corresponding operation (e.g., embedded processor), or a generic-purpose processor (e.g., a central processing unit (CPU) or an application processor) capable of performing the corresponding operations by executing one or more software programs stored in the memory device.

A singular expression includes a plural expression, unless otherwise specified. It is to be understood that the terms such as "form" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

The term "module" or "part" used in the embodiments herein perform at least one function or operation, and may be implemented with a hardware or software, or implemented with a combination of hardware and software. Further, a plurality of "modules" or a plurality of "parts," except for a "module" or a "part" which needs to be implemented to a specific hardware, may be integrated to at least one module and implemented in at least one processor.

The various elements and areas of the drawings have been schematically illustrated. Accordingly, the technical spirit of the disclosure is not limited by relative sizes and distances illustrated in the accompanied drawings.

One or more embodiments of the disclosure will be described in greater detail below with reference to the accompanied drawings.

FIG. 1A is a diagram illustrating an embodiment of a first finger and a second finger provided in a robot according to one or more embodiments.

Referring to FIG. 1A, the robot according to the disclosure may include dual fingers. The dual fingers may include a first finger 1 and a second finger 2.

Here, a finger (or a gripper) may perform a function of gripping an object (e.g., an object of various types). The robot may move the first finger 1 and the second finger 2 to a direction facing each other (e.g., ① and ② in FIG. 1A), and grip the object positioned between the first finger 1 and the second finger 2.

A first optical tactile sensor may be disposed at the first finger 1. The first optical tactile sensor may include a first contact part 10, a first light emitter 110, a first camera 120, and a first polarization filter 130.

Further, a second optical tactile sensor may be disposed at the second finger 2. The second optical tactile sensor may include a second contact part 20, a second light emitter 140, a second camera 150, and a second polarization filter 160.

The first contact part 10 may include a gel 11, and the second contact part 20 may include a gel 21. The gel may be transparent. The gel may be a transparent elastomer.

The first contact part 10 may include a plurality of markers 12. The plurality of markers 12 may be printed with ink, silicon, and the like at one surface of the gel 11. The second contact part 20 may include a plurality of markers 22. The plurality of markers 22 may be printed with ink, silicon, and the like at one surface of the gel 21.

The plurality of markers 12 and 22 may be disposed in a matrix from, and an interval between the plurality of markers 12 and 22 may be the same. Each of the markers 12 and 22 may be a circular shape. However, the disclosure is not limited thereto, and the marker may be in various shapes.

The first contact part 10 may include a coating layer 13. The coating layer 13 may be formed on one surface of the gel 11 to which the plurality of markers 12 are printed. The second contact part 20 may include a coating layer 23. The coating layer 23 may be formed on one surface of the gel 21 to which the plurality of markers 22 are printed. The coating layers 13 and 23 may prevent the plurality of markers 12 and 22 printed on the gels 11 and 21 from being worn. In addition, the coating layers 13 and 23 may be transparent or semi-transparent.

The first light emitter 110 may be provided at the first finger 1, and the second light emitter 140 may be provided at the second finger 2.

Further, the first light emitter 110 and the second light emitter 140 may output light. The first light emitter 110 and the second light emitter 140 may be realized as a light emitting diode (LED). However, the disclosure is not limited to this example, and the first light emitter 110 and the second light emitter 140 may be realized as various types of light emitters that output light.

On an opposite surface of the gel 11, the first polarization filter 130 may be disposed. In addition, on an opposite surface of the gel 21, the second polarization filter 160 may be disposed.

The first polarization filter 130 and the second polarization filter 160 may be turned-on (i.e., activated) and turned-off (i.e., deactivated) according to a voltage applied.

For example, when a first voltage is applied to the first polarization filter 130 and the second polarization filter 160, the first polarization filter 130 and the second polarization filter 160 may be turned-off. In this case, a polarization axis may not be formed at the first polarization filter 130 and the second polarization filter 160, and the first polarization filter 130 and the second polarization filter 160 may transmit light as is (i.e., unfiltered light).

If a second voltage different from the first voltage is applied to the first polarization filter 130 and the second polarization filter 160, the first polarization filter 130 and the second polarization filter 160 may be turned-on. In this case, a polarization axis may be formed at the first polarization filter 130 and the second polarization filter 160, and the first polarization filter 130 and the second polarization filter 160 may transmit only light polarized to be parallel with the polarization axis, and light polarized in a different direction from the above may be absorbed or reflected.

A first polarization axis formed at the first polarization filter 130 and a second polarization axis formed at the second polarization filter 160 may be disposed toward different directions from each other. Specifically, the first polarization axis and the second polarization axis may be orthogonal to each other. For example, the first polarization filter 130 having the first polarization axis may transmit a horizontally linear polarized light, and the second polarization filter 160 having the second polarization axis may transmit a vertically linear polarized light.

The first polarization filter 130 may transmit a polarized light in a first direction from among light output from the first light emitter 110 according to the voltage applied or light output from the first light emitter 110 and provide to the first contact part 10.

Specifically, when the first polarization filter 130 is turned-off according to the voltage applied, the first polarization filter 130 may transmit light output from the first light emitter 110 and provide to the first contact part 10. That is, the first polarization filter 130 may transmit light output from the first light emitter 110 as is and provide said light to the first contact part 10. Then, if the first polarization filter 130 is turned-on according to the voltage applied, the first polarization filter 130 may transmit the horizontally linear polarized light from among the light output from the first light emitter 110 and provide said light to the first contact part 10.

From the above, the light provided to the first contact part 10 may be output to an outside of the first optical tactile sensor by being transmitting through the first contact part 10.

The second polarization filter 160 may transmit a polarized light in a second direction from among light output from the second light emitter 140 according to the voltage applied or light output from the second light emitter 140 and provide to the second contact part 20. Here, the second direction may be different from the first direction. For example, the second direction may be a direction orthogonal to the first direction.

Specifically, when the second polarization filter 160 is turned-off according to the voltage applied, the second polarization filter 160 may transmit light output from the second light emitter 140 and provide to the second contact part 20. That is, the second polarization filter 160 may transmit light output from the second light emitter 140 as is and provide said light to the second contact part 20. Then, if the second polarization filter 160 is turned-on according to the voltage applied, the second polarization filter 160 may transmit the vertically linear polarized light from among the light output from the second light emitter 140 and provide said light to the second contact part 20.

From the above, the light provided to the second contact part 20 may be output to an outside of the second optical tactile sensor by being transmitting through the second contact part 20.

In the above-described example, a horizontal polarization axis being formed at the first polarization filter 130 and a vertical polarization axis being formed at the second polarization filter 160 have been described. However, the disclosure is not limited thereto, and the vertical polarization axis may be formed at the first polarization filter 130, and the horizontal polarization axis may be formed at the second polarization filter 160.

The first camera 120 and the second camera 150 may capture images. The first camera 120 and the second camera 150 may capture a still image or a moving image. That is, the first camera 120 and the second camera 150 may capture a still image at a specific time-point, but may also capture still images consecutively.

To this end, the first camera 120 and the second camera 150 may each include a lens, an image sensor, and the like. That is, the first camera 120 and the second camera 150 may convert light incident through the lens to an electric image signal through the image sensor.

The first camera 120 may be provided at the first finger 1. Then, the first camera 120 may capture a direction at which the first contact part 10 is positioned. That is, the first camera 120 may be disposed such that a capturing direction faces toward the first contact part 10. Further, the first contact part 10 may be positioned within a field of view (FoV) of the first camera 120.

As described above, the first contact part 10 may include a coating layer 13 which is transparent or semi-transparent.

If the coating layer 13 is transparent, the first camera 120 may capture the outside of the first optical tactile sensor visible through the plurality of markers 12 of the first contact part 10 and the first contact part 10 regardless of an on and off state of the first light emitter 110. Accordingly, an image captured by the first camera 120 may include the plurality of markers 12 of the first contact part 10 and an outside area of the first optical tactile sensor. In this case, based on the first light emitter 110 being in an on state rather than an off state, the plurality of markers 12 may be captured more clearly.

If the coating layer 13 is semi-transparent, the outside of the first optical tactile sensor may be captured or may not be captured by the first camera 120 according to the on and off state of the first light emitter 110. Specifically, if the first light emitter 110 is in the on state, the first camera 120 may not view the outside of the first optical tactile sensor through the semi-transparent coating layer 13 due to the light output from the first light emitter 110. Accordingly, the image captured by the first camera 120 may include the plurality of markers 12 of the first contact part 10. However, if the first light emitter 110 is in the off state, the first camera 120 may view the outside of the first optical tactile sensor through the semi-transparent coating layer 13 due to light (e.g., outside lighting, etc.) outside the first optical tactile sensor. Accordingly, the image captured by the first camera 120 may include the plurality of markers 12 of the first contact part 10 and the outside area of the first optical tactile sensor.

The second camera 150 may be provided at the second finger 2. Further, the second camera 150 may capture a direction at which the second contact part 20 is positioned. That is, the second camera 150 may be disposed such that the capturing direction faces toward the second contact part 20. Then, the second contact part 20 may be positioned within a field of view of the second camera 150.

As described above, the second contact part 20 may include the coating layer 23 which is transparent or semi-transparent.

If the coating layer 23 is transparent, the second camera 150 may capture the plurality of markers 22 of the second contact part 20 and an outside of the second optical tactile sensor visible through the second contact part 20 regardless of an on and off state of the second light emitter 140. Accordingly, an image captured by the second camera 150 may include the plurality of markers 22 of the second contact part 20 and an outside area of the second optical tactile sensor. In this case, based on the second light emitter 140 being in an on state rather than an off state, the plurality of markers 22 may be captured more clearly.

If the coating layer 23 is semi-transparent, the outside of the second optical tactile sensor may be captured or may not be captured by the second camera 150 according to the on and off state of the second light emitter 140. Specifically, if the second light emitter 140 is in the on state, the second camera 150 may not view the outside of the second optical tactile sensor through the semi-transparent coating layer 23 due to the light output from the second light emitter 140. Accordingly, the image captured by the second camera 150 may include the plurality of markers 22 of the second contact part 20. However, if the second light emitter 140 is in the off state, the second camera 150 may view the outside of the first optical tactile sensor through the semi-transparent coating layer 23 due to light (e.g., outside lighting, etc.) outside the second optical tactile sensor. Accordingly, the image captured by the second camera 150 may include the plurality of markers 22 of the second contact part 20 and the outside area of the second optical tactile sensor.

Figure 1B:
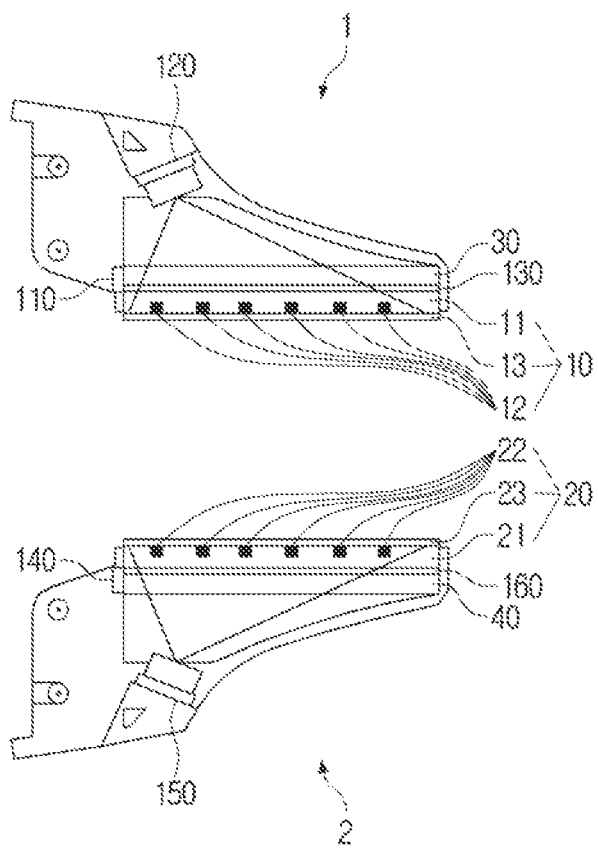
FIG. 1B is a diagram illustrating a detailed embodiment of a first finger and a second finger provided in a robot according to one or more embodiments.

FIG. 1B is a diagram illustrating a detailed embodiment of the first finger and the second finger provided in the robot according to one or more embodiments.

Referring to FIG. 1B, the first optical tactile sensor disposed at the first finger 1 may further include not only the first contact part 10, the first light emitter 110, the first camera 120, and the first polarization filter 130 as shown in FIG. 1A, but also a support layer 30. In addition, the second optical tactile sensor disposed at the second finger 2 may further include not only the second contact part 20, the second light emitter 140, the second camera 150, and the second polarization filter 160, but also a support layer 40.

When gripping an object using the first finger 1 and the second finger 2, force may be applied to the first contact part 10 and the second contact part 20 by the object. In this case, the first contact part 10 may be supported by the support layer 30, and the second contact part 20 may be supported by the support layer 40. The support layer 30 and the support layer 40 may be realized with a transparent resin or acryl.

As shown in FIG. 1A and FIG. 1B, the robot may grip an object using the first finger 1 disposed with the first optical tactile sensor and the second finger 2 disposed with the second optical tactile sensor. As described above, when the optical tactile sensor is used, a position and size of a contact surface may be identified like a skin of a person, and small changes in force may be detected. In addition, if the surface of the optical tactile sensor corresponding to the skin of a person is transparent or semi-transparent, there is an advantage in a narrow space based on the object outside the sensor being detected and gripped using a camera inside the sensor without a separate sensor.

The robot may position the object between the first finger 1 and the second finger 2, and move the first finger 1 and the second finger 2 respectively to the direction at which the object is positioned and grip the object using the first finger 1 and the second finger 2.

In this case, the robot may use the plurality of markers 12 captured through the first camera 120 and identify whether the object has been contacted at the first contact part 10 of the first finger 1, and use the plurality of markers 22 captured through the second camera 150 and identify whether the object has been contacted at the second contact part 20 of the second finger 2.

As described above, when the first finger 1 and the second finger 2 are disposed to face each other, the second optical tactile sensor may be positioned within the field of view of the first camera 120 disposed inside the first optical tactile sensor, and the second optical tactile sensor may be positioned within the field of view of the second camera 150 disposed inside the second optical tactile sensor.

In such a configuration, if the second light emitter 140 disposed inside the second optical tactile sensor is in the on state, the light output from the second light emitter 140 may be provided to the first optical tactile sensor by being transmitted through the second contact part 20 and thereby, the first camera 120 may receive interference. Likewise, if the first light emitter 110 disposed inside the first optical tactile sensor is in the on state, the light output from the first light emitter 110 may be provided to the second optical tactile sensor by being transmitted through the first contact part 10 and thereby, the second camera 150 may receive interference. Because of the interferences, a wrongful sensing result may be incurred from sensing a contact of an object for the first contact part 10 and the second contact part 20.

In the disclosure, interference by one optical tactile sensor affecting another optical tactile sensor may be prevented by controlling the one and off state of the first light emitter 110, the first polarization filter 130, the second light emitter 140, and the second polarization filter 160.

Figure 2A:
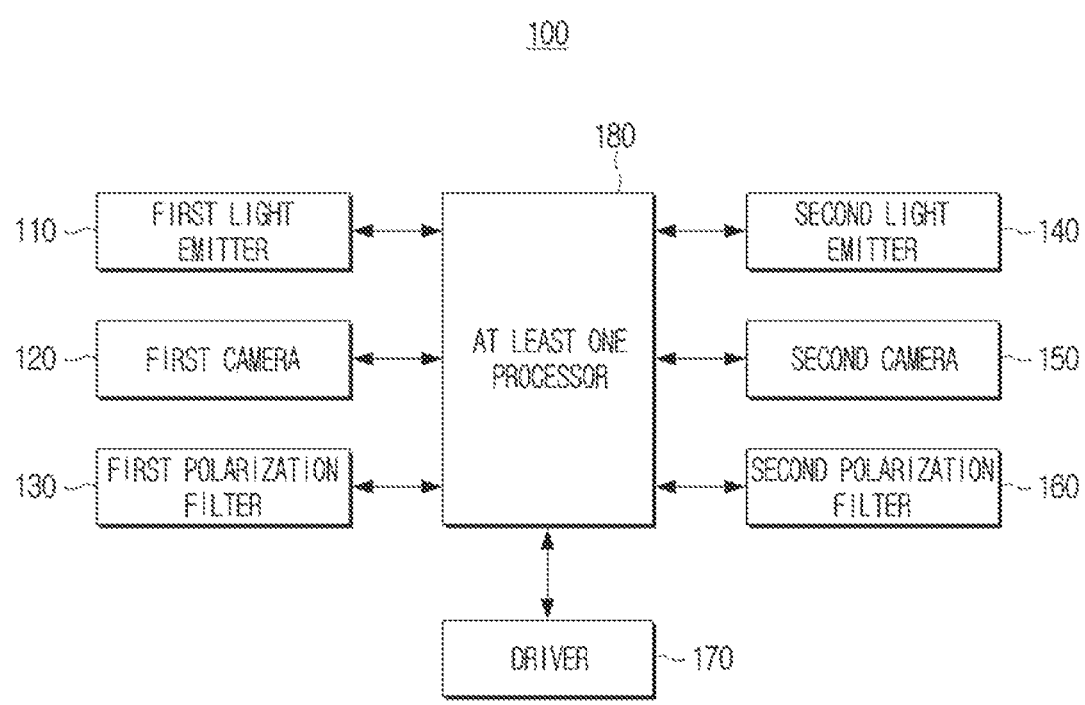
FIG. 2A is a block diagram illustrating a configuration of a robot according to one or more embodiments.

FIG. 2A is a block diagram illustrating a configuration of a robot according to one or more embodiments.

Referring to FIG. 2A, a robot 100 may include the first light emitter 110, the first camera 120, the first polarization filter 130, the second light emitter 140, the second camera 150, the second polarization filter 160, a driver 170, and at least one processor 180.

As described in FIG. 1A and FIG. 1B, the robot 100 may include the first finger 1 formed with the first contact part 10 and the second finger 2 formed with the second contact part 20. Because the first light emitter 110, the first camera 120, the first polarization filter 130, the second light emitter 140, the second camera 150, and the second polarization filter 160 have been described in detail in FIG. 1A, redundant descriptions thereof will be omitted.

In addition, the robot 100 may include the first finger 1 formed with the first contact part 10 and the second finger 2 formed with the second contact part 20.

In this case, the first contact part 10 may include a first gel 11 including the plurality of markers 12 and a first coating layer 13 formed on the first gel 11. Then, the second contact part 20 may include a second gel 21 including the plurality of markers 22 and a second coating layer 23 formed on the second gel. The first and second coating layers 13 and 23 may be transparent or semi-transparent.

The driver 170 may drive the first finger 1 and the second finger 2. To this end, the driver 170 may include a motor, an actuator, a gear, and the like.

Figure 3:
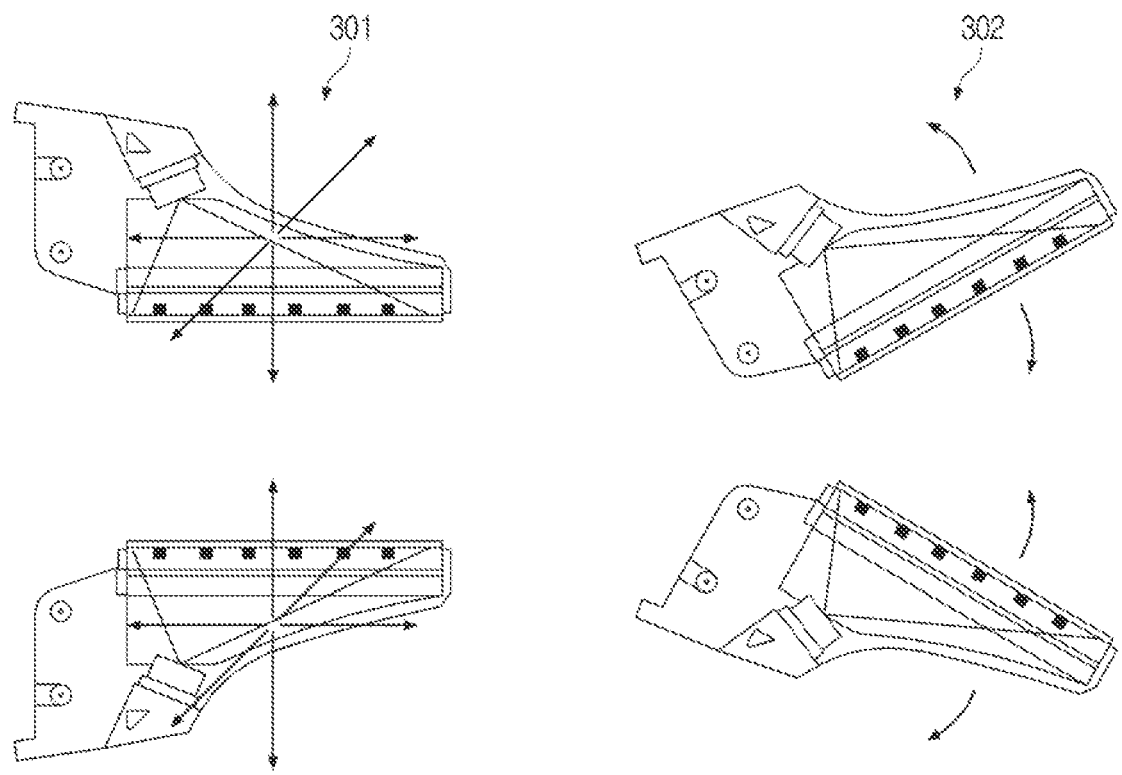
FIG. 3 is a diagram illustrating an example of a first finger and a second finger moving and rotating according to one or more embodiments.

Specifically, the driver 170 may move the first finger 1 and the second finger 2. For example, as in 301 in FIG. 3, the driver 170 may move the first finger 1 and the second finger 2 in an upper/lower/left/right direction and a front/back direction, respectively. In addition, as in 302 in FIG. 3, the driver 170 may rotate the first finger 1 and the second finger 2, respectively, in a clockwise and anti-clockwise direction.

In addition, the driver 170 may operate the first finger 1 and the second finger 2 separately. Accordingly, the first finger 1 and the second finger 2 may be moved and operated separately.

The at least one processor 180 may control the overall operation of the robot 100. Specifically, the at least one processor 180 may control the overall operation of the robot 100 by being coupled with each configuration of the robot 100. For example, the at least one processor 180 may control the robot 100 by being electrically coupled with the first light emitter 110, the first camera 120, the first polarization filter 130, the second light emitter 140, the second camera 150, the second polarization filter 160, and the driver 170. The at least one processor 180 may be formed of one or a plurality of processors.

The at least one processor 180 may perform an operation of the robot 100 according to one or more embodiments by executing a least one instruction stored in the memory.

The at least one processor 180 may include at least one from among a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. The at least one processor 180 may control one or a random combination from among other elements of the robot 100, and perform an operation associated with communication or data processing. The at least one processor 180 may execute at least one program or instruction stored in the memory. For example, the at least one processor 180 may perform, by executing at least one instruction stored in the memory, a method according to one or more embodiments of the disclosure.

When a method according to one or more embodiments of the disclosure include a plurality of operations, the plurality of operations may be performed by one processor, or performed by the plurality of processors. For example, when a first operation, a second operation, and a third operation are performed by a method according to one or more embodiments, the first operation, the second operation, and the third operation may all be performed by a first processor, or the first operation and the second operation may be performed by the first processor (e.g., a generic-purpose processor) and the third operation may be performed by a second processor (e.g., an artificial intelligence dedicated processor).

The at least one processor 180 may be realized as a single core processor that includes one core, or as at least one multicore processor that includes a plurality of cores (e.g., a homogeneous multicore or a heterogeneous multicore). If the at least one processor 180 is realized as a multicore processor, each of the cores included in the multicore processor may include a memory inside the processor such as a cache memory and an on-chip memory, and a common cache shared by the plurality of cores may be included in the multicore processor. In addition, each of the cores (or a portion from among the plurality of cores) included in the multicore processor may independently read and perform a program command for realizing a method according to one or more embodiments, or read and perform a program command for realizing a method according to one or more embodiments of the disclosure due to a whole (or a portion) of the plurality of cores being interconnected.

When a method according to one or more embodiments of the disclosure includes a plurality of operations, the plurality of operations may be performed by one core from among the plurality of cores or performed by the plurality of cores included in the multicore processor. For example, when a first operation, a second operation, and a third operation are performed by a method according to one or more embodiments, the first operation, the second operation, and the third operation may all be performed by a first core included in the multicore processor, or the first operation and the second operation may be performed by the first core included in the multicore processor and the third operation may be performed by a second core included in the multicore processor.

According to one or more embodiments, the processor may refer to a system on chip (SoC), a single core processor, or a multicore processor in which the at least one processor and other electronic components are integrated or a core included in the single core processor or the multicore processor, and the core herein may be realized as the CPU, the GPU, the APU, the MIC, the NPU, the hardware accelerator, the machine learning accelerator, or the like, but is not limited to the one or more embodiments of the disclosure.

For convenience of description, the at least one processor 180 may be designated below as a processor 180.

The processor 180 may control, based on an object being positioned between the first contact part 10 and the second contact part 20, the one or off state of the first light emitter 110, the second light emitter 140, the first polarization filter 130, and the second polarization filter 160 and obtain a first image through the first camera 120 and obtain a second image through the second camera 150.

Then, the processor 180 may control the driver 170 such that the first finger 1 and the second finger 2 are able to grip the object while a difference of the first distance between the first contact part 10 and the object based on the first image and the second image and a second distance between the second contact part 20 and the object is maintained within a pre-set threshold range.

Here, a pre-set threshold range may include 0, and an upper limit and a lower limit of the pre-set range may be a value close to 0.

That is, the first finger 1 and the second finger 2 gripping the object while the difference between the first distance and the second distance is maintained within the pre-set threshold range may refer to the first finger 1 and the second finger 2 moving respectively toward the direction at which the object is positioned while the first distance and the second distance are maintained same (or nearly same), and the first finger 1 and the second finger 2 respectively being contacted at the object and gripping the object.

Figure 2B:
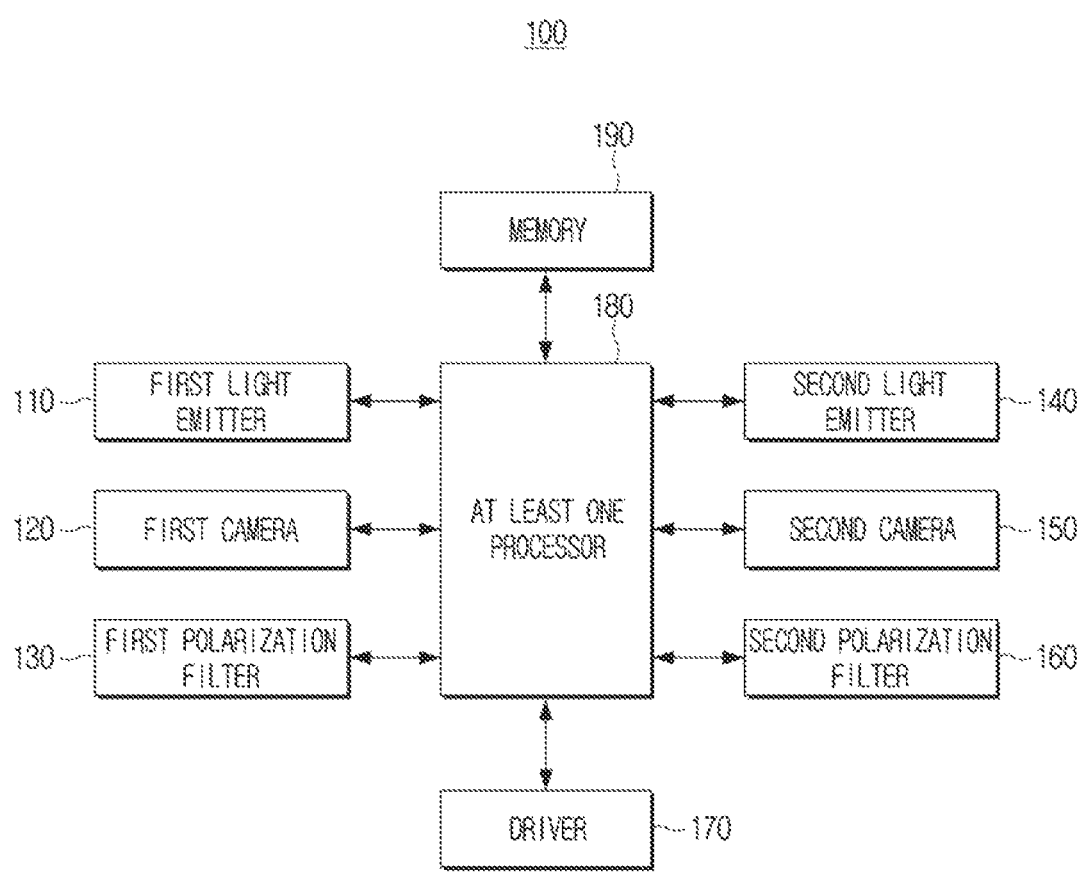
FIG. 2B is a block diagram illustrating a detailed configuration of a robot according to one or more embodiments.

FIG. 2B is a block diagram illustrating a detailed configuration of a robot according to one or more embodiments.

Referring to FIG. 2B, the robot 100 may include the first light emitter 110, the first camera 120, the first polarization filter 130, the second light emitter 140, the second camera 150, the second polarization filter 160, the driver 170, the at least one processor 180, and a memory 190. However, the configuration described above is merely an example. In realizing the disclosure, a new configuration may be added in addition to the configurations described above or some configurations may be omitted. Detailed descriptions of configurations that overlap with the configurations shown in FIG. 2A from among the configurations shown in FIG. 2B will be omitted.

The memory 190 may store data necessary for one or more embodiments.

The memory 190 may be realized in a form of a memory embedded to the robot 100 according to data storage use, or realized in a form of a memory attachable to or detachable from the robot 100.

For example, the memory embedded to the robot 100 may be realized as at least one from among a volatile memory (e.g., a dynamic random access memory (DRAM), a static RAM (SRAM), or a synchronous dynamic RAM (SDRAM)), or a non-volatile memory (e.g., one time programmable read only memory (OTPROM), programmable ROM (PROM), erasable and programmable ROM (EPROM), electrically erasable and programmable ROM (EEPROM), mask ROM, flash ROM, a flash memory (e.g., NAND flash or NOR flash), a hard disk drive (HDD) or a solid state drive (SSD)).

In addition, in the case of the memory attachable to or detachable from the robot 100, the memory may be realized in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., USB memory) connectable to a universal serial bus (USB) port (e.g., USB memory), or the like.

The memory 190 may be stored with at least one instruction for driving the robot 100. In this case, the processor 180 may perform, by executing at least one instruction stored in the memory 190, an operation of the robot 100 according to one or more embodiments. In addition, the memory 190 may be stored a program and data for the driving of the robot 100.

The processor 180 may perform, based on an object being positioned between the first finger 1 and the second finger 2, an operation for gripping the object by moving the first finger 1 and the second finger 2 respectively toward a direction at which the object is positioned.

In this case, the processor 180 may detect the object positioned between the first finger 1 and the second finger 2, and move the first finger 1 and the second finger 2 respectively toward the direction at which the object is positioned such that the first finger 1 and the second finger 2 are contacted at the object.

To this end, the processor 180 may control the on or off state (i.e., the activation state) of the first light emitter 110, the second light emitter 140, the first polarization filter 130, and the second polarization filter 160, and the above will be described in greater detail below.

Figure 4:
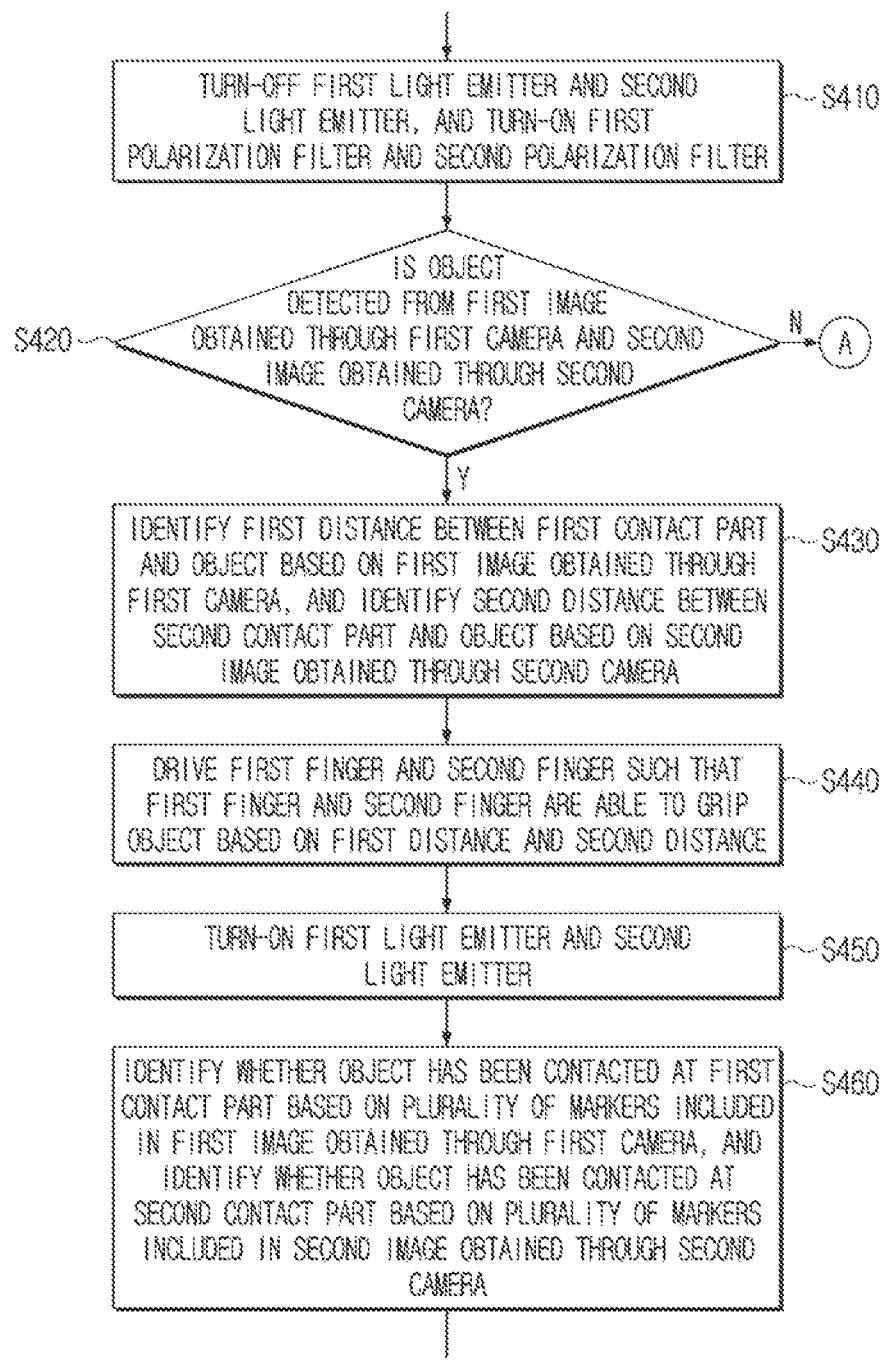
FIG. 4 to FIG. 11 are flow charts and diagrams illustrating a process by which a robot grips an object positioned between a first finger and a second finger according to one or more embodiments.

FIG. 4 is a flow chart illustrating a method of a robot gripping an object positioned between the first finger and the second finger according to one or more embodiments.

Referring to FIG. 4, the processor 180 may turn-off (i.e., deactivate) the first light emitter 110 and the second light emitter 140, and turn-on (i.e., activate) the first polarization filter 130 and the second polarization filter 160 (S410).

Then, the processor 180 may identify whether an object is detected from the first image obtained through the first camera 120 and the second image obtained through the second camera 150 (S420).

Specifically, the processor 180 may obtain the first image by capturing a direction at which the first contact part 10 is positioned through the first camera 120, and obtain the second image by capturing a direction at which the second contact part 20 is positioned through the second camera 150.

Then, the processor 180 may identify whether the object is detected from the first image and the second image.

Figure 5:
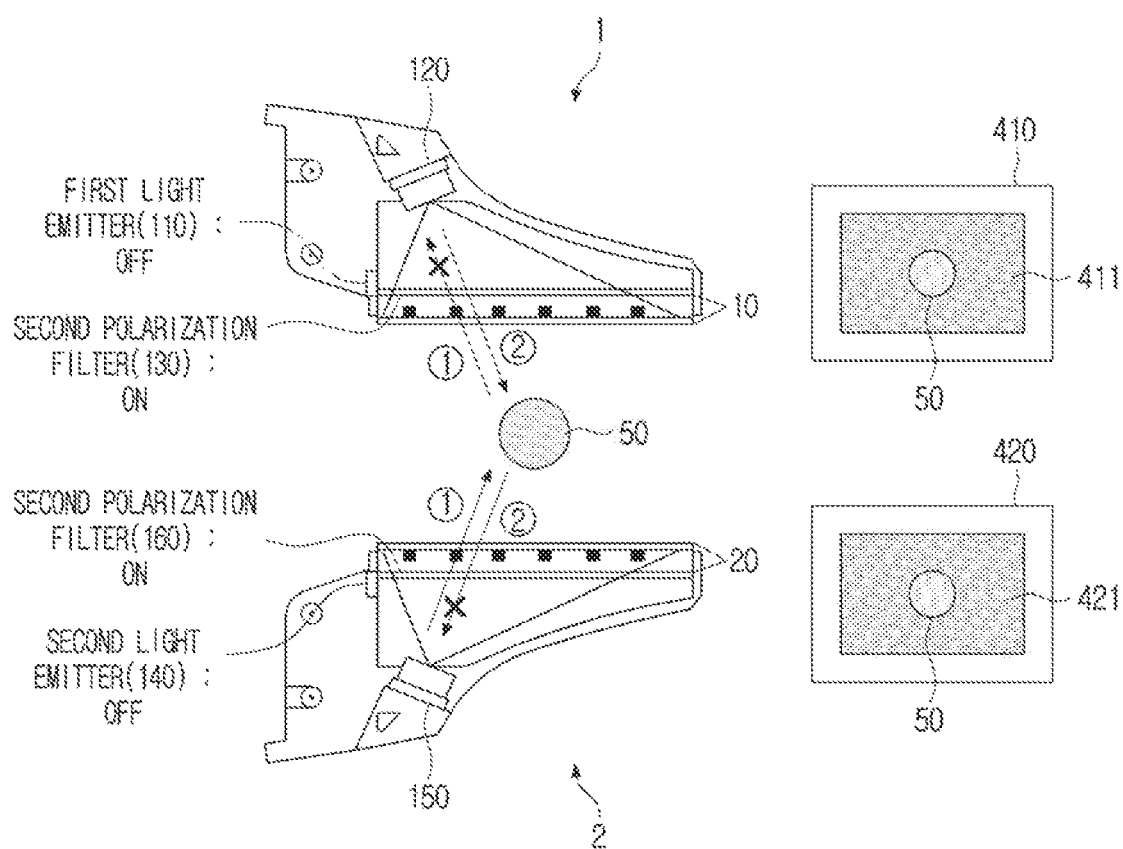

Referring to FIG. 5, the first camera 120 may capture the outside of the first optical tactile sensor through the first contact part 10 based on the first light emitter 110 being in the off state. In addition, the second camera 150 may capture the outside of the second optical tactile sensor through the second contact part 20 based on the second light emitter 140 being in the off state.

In addition, light incident from the first optical tactile sensor by transmitting through second polarization filter 160 may be blocked by the first polarization filter 130 based on the first polarization filter 130 and the second polarization filter 160 being in the on state (① in FIG. 5). Accordingly, an area which captured the second contact part 20 from a first image 410 captured by the first camera 120 may be a black area 411. Likewise, light incident from the second optical tactile sensor by transmitting through the first polarization filter 130 may be blocked by the second polarization filter 160 (② in FIG. 5). Accordingly, an area which captured the first contact part 10 from a second image 420 captured by the second camera 150 may be a black area 421.

The processor 180 may extract features such as an edge, a corner, and the like from the first image and the second image, and detect an object from the first image and the second image using the extracted features. However, this is merely one example, and the processor 180 may detect the object from an image using various object detection algorithms.

Referring to FIG. 5, the first image 410 and the second image 420 may include black areas 411 and 421. Accordingly, if a surrounding of the robot 100 is bright, and a color of an object 50 is bright, the object 50 included in each of the first image 410 and the second image 420 may be differentiated from the black areas 411 and 421, and the object 50 may be detected from the first image 410 and the second image 420.

The processor 180 may identify, based on the object being detected (S420-Y), the first distance between the first contact part 10 and the object based on the first image, and identify the second distance between the second contact part 20 and the object based on the second image (S430).

Specifically, the processor 180 may identify the first distance between the first contact part 10 and the object based on a sharpness of the area in which the object is included from the first image, and identify the second distance between the second contact part 20 and the object based on a sharpness of the area in which the object is included from the second image.

That is, even if the gels 11 and 21 and the coating layers 13 and 23 are of a transparent material, because the materials are not fully transparent, the sharpness of the area in which the object is included in each of the first image and the second image may decrease as the object is positioned further away from the first contact part 10 and the second contact part 20.

Accordingly, the processor 180 may calculate the sharpness of the area in which the object is included from the first image, and determine a distance corresponding to the calculated sharpness from among a plurality of distances corresponding to a plurality of sharpnesses as the first distance between the first contact part 10 and the object. In addition, the processor 180 may calculate the sharpness of the area in which the object is included from the second image, and determine a distance corresponding to the calculated sharpness from among the plurality of distances corresponding to the plurality of sharpnesses as the second distance between the second contact part 20 and the object.

To this end, information about the distance corresponding to each sharpness for the respective sharpnesses may be pre-stored in the memory 190. In this case, the distance corresponding to each sharpness for the respective sharpnesses may be experimentally measured.

In the above-described example, the distance between the object and the contact part has been described as being determined based on the sharpness, but is not limited to the above-described example.

For example, the processor 180 may identify the position of the object using a triangulation method, and determine the first distance between the first contact part 10 and the object and the second distance between the second contact part 20 and the object using the identified position.

Specifically, the processor 180 may identify the position of the second camera 150 which is based on the position of the first camera 120 (e.g., coordinates) based on an orientation of the first finger 1 and an orientation of the second finger. Here, the orientation may be determined based on a distance moved by the finger from a reference position, a direction toward which the finger rotated, and the like.

Then, the processor 180 may estimate an angle at which the object is positioned based on the first camera 120 based on a capturing direction of the first camera 120 and the position of the area in which the object is included from an image captured through the first camera 120. In addition, the processor 180 may estimate an angle at which the object is positioned based on the second camera 150 based on a capturing direction of the second camera 150 and the position of the area in which the object is included from an image captured through the second camera 150.

Then, the processor 180 may determine the position of the object using the position of the first camera 120, the position of the second camera 150, the angle at which the object is positioned based on the first camera 120, and the angle at which the object is positioned based on the second camera 150. Then, the processor 180 may determine the first distance between the first contact part 10 and the object and the second distance between the second contact part 20 and the object based on the position of the first camera 120, the position of the second camera 150, and the position of the object taking into consideration a positon relationship between the first camera 120 and the first contact part 10 and a positon relationship between the second camera 150 and the second contact part 20.

Then, the processor 180 may control the driver 170 such that the first finger 1 and the second finger 2 are able to grip the object based on the first distance and the second distance (S440).

That is, the processor 180 may control the driver 170 such that the first finger 1 and the second finger 2 respectively move toward the direction at which the object is positioned while the difference of the first distance between the first contact part 10 and the object and the second distance between the second contact part 20 and the object is maintained within the pre-set range.

Here, the pre-set range may include a pre-set value (i.e., 0), and the upper limit and the lower limit of the pre-set range may be a value close to 0.

That is, the first finger 1 and the second finger 2 being moved while the difference between the first distance and the second distance is maintained within the pre-set range may refer to the first finger 1 and the second finger 2 moving respectively toward the direction at which the object is positioned while the first distance and the second distance are maintained the same (or nearly same), and the first finger 1 and the second finger 2 respectively being contacted at the object and gripping the object.

Specifically, the processor 180 may move the first finger 1 and the second finger 2 at a same rate (or nearly same) to maintain the distance between the first distance and the second distance within the pre-set range based on the first distance and the second distance being the same (or nearly same).

In addition, the processor 180 may move, based on the first distance being greater than the second distance, the first finger 1 at a relatively faster rate than the second finger 2. Then, the processor 180 may move, based on the first distance and the second distance becoming the same (or nearly same), the first finger 1 and the second finger 2 at the same rate (or nearly same) to maintain the difference between the first distance and the second distance within the pre-set range.

Then, the processor 180 may move, based on the second distance being greater than the first distance, the second finger 2 at a relatively faster rate than the first finger 1. Then, the processor 180 may move, based on the first distance and the second distance becoming the same (or nearly same), the first finger 1 and the second finger 2 at the same (or nearly same) rate to maintain the difference between the first distance and the second distance within the pre-set range.

As described above, if the first finger 1 and the second finger 2 are moved, the first finger 1 and the second finger 2 may be contacted at the object simultaneously (or nearly simultaneously), and accordingly, the object may be gripped more stably through the first finger 1 and the second finger 2.

Figure 6:
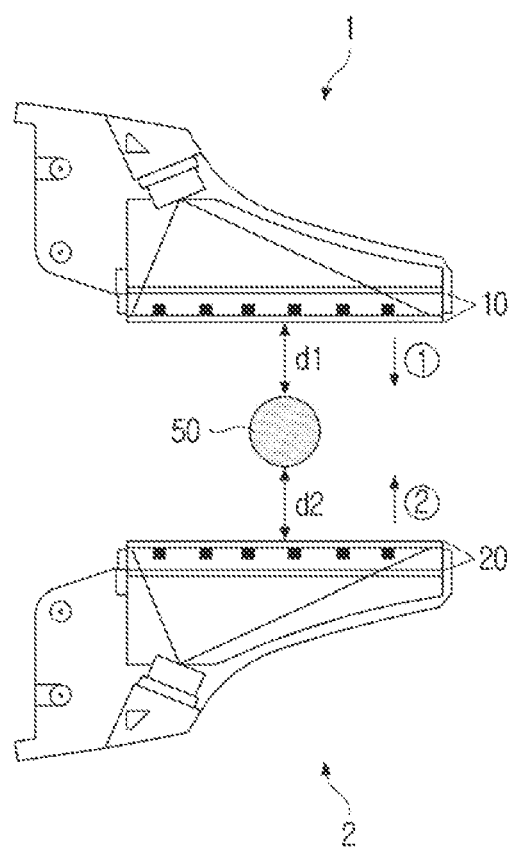

For example, referring to FIG. 6, the first finger 1 may move toward the direction at which the object 50 is positioned (①) in FIG. 6), and the second finger 2 may move toward the direction at which the object 50 is positioned. At this time, a first distance d1 between the first contact part 10 and the object 50 and a second distance d2 between the second contact part 20 and the object 50 may be maintained to be equal to one other.

The processor 180 may move the first finger 1 such that the object is positioned at a pre-set area in the first image captured through the first camera 120. In addition, the processor 180 may move the second finger 2 such that the object is positioned at a pre-set area in the second image captured through the second camera 150.

As described above, if the object is positioned at the pre-set areas of each of the first image and the second image, the object may be contacted by a center area of the first contact part 10 and a center area of the second contact part 20, respectively, when the object is gripped by moving the first finger 1 and the second finger 2, respectively, toward the direction at which the object is positioned.

Figure 7:
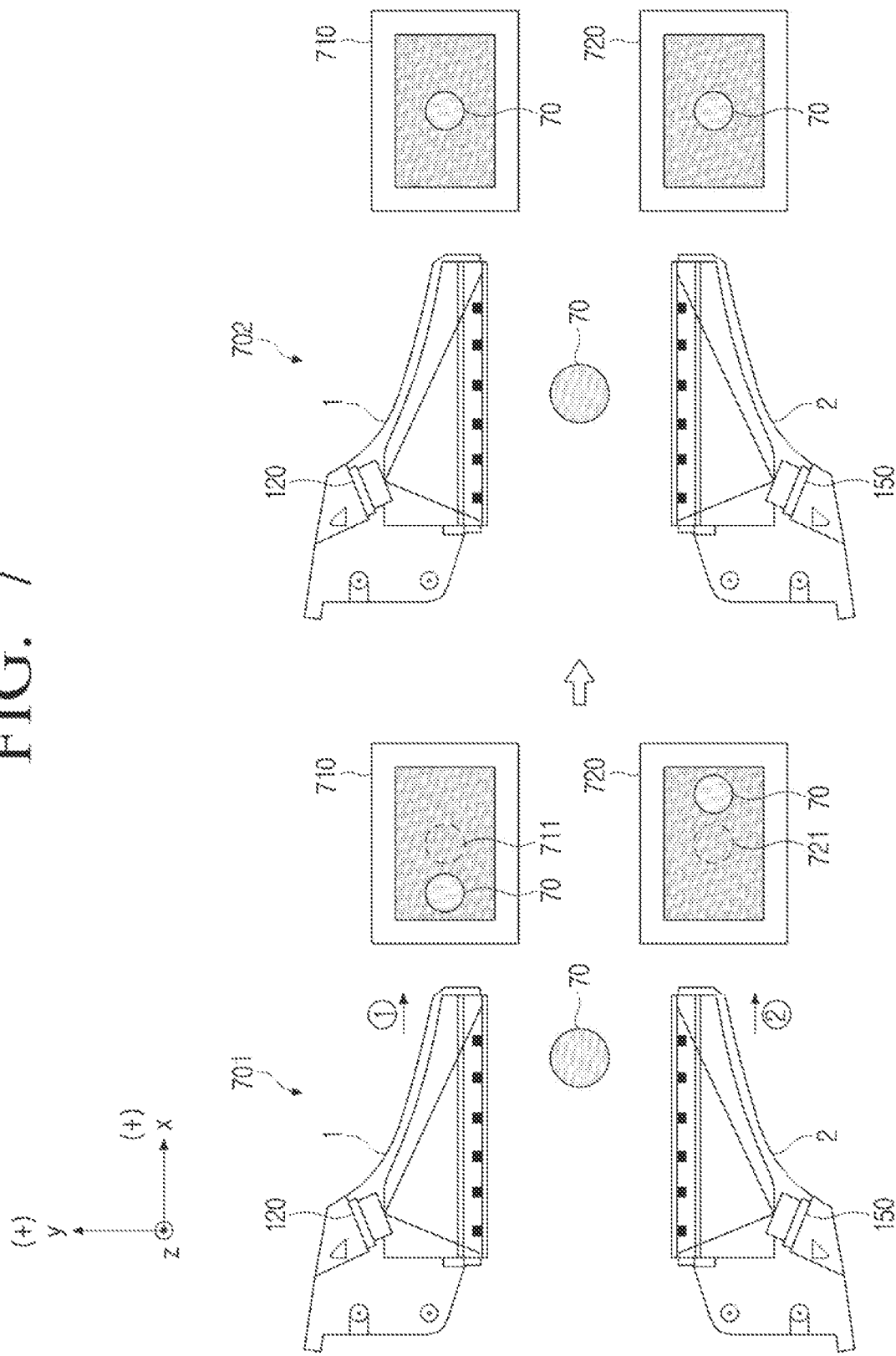

For example, as in 701 in FIG. 7, an object 70 being detected from a left part of a first image 70 captured through the first camera 120, and the object 70 being detected from a right part of a second image 720 captured through the second camera 150 may be assumed. In this case, the processor 180 may control the driver 170 such that the first finger 1 and the second finger 2 are moved toward a (+) direction of an x-axis.

Then, the processor 180 may detect the object from the first image captured through the first camera 120 and from the second image captured through the second camera 150, and identify the position of the detected object. In this case, as in 702 in FIG. 7, the processor 180 may control, based on the object 70 being positioned at a pre-set area 711 of the first image 710, and the object being positioned at a pre-set area 721 of the second image 720, the driver 170 to stop the first finger 1 and the second finger 2. Then, the processor 180 may move the first finger 1 and the second finger 2 toward the direction at which the object is positioned, respectively.

As described above, if the first finger 1 and the second finger 2 are moved, the object may be contacted by the center area of the first contact part 10 and the center area of the second contact part 20, and accordingly, the object may be gripped more stably through the first finger 1 and the second finger 2.

Referring back to FIG. 4, the processor 180 may turn-on (i.e., activate) the first light emitter 110 and the second light emitter 140 (S450). In this case, the first polarization filter 130 and the second polarization filter 160 may be in the on state.

As described above, the turning-on the first light emitter 110 and the second light emitter 140 may be to capture (or clearly capture) the plurality of markers 12 of the first contact part 10 using the first camera 120, and to capture (or clearly capture) the plurality of markers 22 of the second contact part 20 using the second camera 150.

Then, the processor 180 may identify whether the object has been contacted at the first contact part 10 based on the plurality of markers 12 included in the first image obtained through the first camera 120, and identify whether the object has been contacted at the second contact part 20 based on the plurality of markers 22 included in the second image obtained through the second camera 150 (S460).

Specifically, when the object is contacted at the first contact part 10 and the second contact part 20 according to movement of the first finger 1 and the second finger 2, force may be applied to the first contact part 10 and the second contact part 20 by the object. Based on the first contact part 10 and the second contact part 20 being formed with a gel, the first contact part 10 and the second contact part 20 may be deformed by the applied force, and at least one from among the plurality of markers included in each of the first contact part 10 and the second contact part 20 may be moved.

Accordingly, the processor 180 may identify whether at least one marker from among the plurality of markers 12 has moved from the first image obtained through the first camera 120, and identify whether the object has been contacted at the first contact part 10. In addition, the processor 180 may identify whether at least one marker from among the plurality of markers 22 has moved from the second image obtained through the second camera 150, and identify whether the object has been contacted at the second contact part 20.

Figure 8:
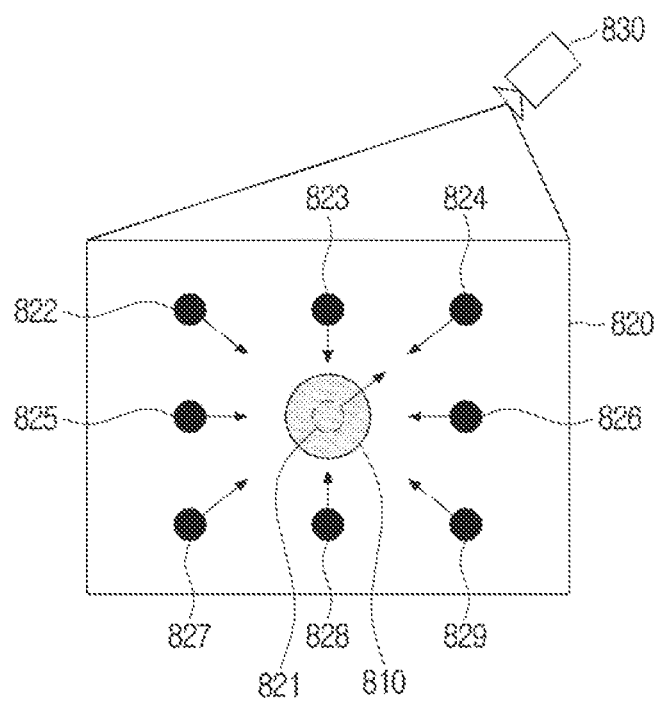

FIG. 8 is a diagram illustrating an example of a method of identifying whether an object has been contacted at a contact part using a plurality of markers included in the contact part according to one or more embodiments.

As shown in FIG. 8, when force is applied by an object 810 in a direction perpendicular to a contact part 820, a plurality of markers 821 to 829 included in the contact part 820 may be moved according to a deformation of the contact part 820.

In this case, a marker disposed at a center point of force in a perpendicular direction may be moved toward a back according to a direction to which the force is applied, and surrounding markers may be moved toward the center point.

For example, as with arrow directions in FIG. 8, the plurality of markers 821 to 829 may be moved. In this case, based on a camera 830 capturing the contact part 820 from an opposite direction of the object 810, a first marker 821 disposed at the center point in the captured image may increase in size than its original size, and positions of a second marker to an eighth marker 822 to 823 may be moved. The processor 180 may detect the movements of the markers, and identify whether the object has been contacted at the contact part.

The processor 180 may turn off (i.e., deactivate), based on the object being identified as not being contacted at the first contact part 10, and the object being identified as not being contacted at the second contact part 20, the first light emitter 110 and the second light emitter 140. In this case, the first polarization filter 130 and the second polarization filter 160 may maintain the on state.

Then, the processor 180 may repeat and perform operations S430, S440, S450, and S460.

As described above, the processor 1080 may move the first finger 1 and the second finger 2 respectively toward the direction at which the object is positioned while turning-on and turning-off the first light emitter 110 and the second light emitter 140, and identify whether the object has been contacted at the first contact part 10 and the second contact part 20.

Specifically, the processor 180 may determine the first distance between the first contact part 10 and the object and the second distance between the second contact part 20 and the object based on the first image and the second image obtained through the first camera 120 and the second camera 150 while the first light emitter 110 and the second light emitter 140 are in the on state, and control the driver 170 such that the first finger 1 and the second finger 2 respectively move toward the direction at which the object is positioned while the difference between the first distance and the second distance is maintained within the pre-set range.

Then, the processor 180 may turn off the first light emitter 110 and the second light emitter 140 while the first finger 1 and the second finger 2 are in movement, and identify whether the object has been contacted at the first contact part 10 and the second contact part 20, respectively, based on the first image and the second image obtained through the first camera 120 and the second camera 150 while the first light emitter 110 and the second light emitter 140 are in the off state.

In this case, the processor 180 may repetitively perform the above-described operation until the object is identified as contacted at the first contact part 10 and the second contact part 20.

As described above, the first light emitter 110 and the second light emitter 140 may be turned on and turned off. In this case, the processor 180 may turn off the first light emitter 110 and the second light emitter 140 for a first time period, and turn on the first light emitter 110 and the second light emitter 140 for a second time period. Here, the first time period and the second time period may have a same length.

The processor 180 may turn off, based on the first distance between the first contact part 10 and the object and the second distance between the second contact part 20 and the object being less than or equal to a pre-set distance, the first light emitter 110 and the second light emitter 140 for the first time period, and turn on the first light emitter 110 and the second light emitter 140 for the second time period which is longer than the first time period.

That is, the processor 180 may set, based on the first distance and the second distance being less than or equal to the pre-set distance, a length of the second time period to be longer than a length of the first time period. Specifically, if the object is close to the first finger 1 and the second finger 2, the object may be contacted at the first contact part 10 and the second contact part 20 within a short time. Accordingly, if the first distance and the second distance are respectively less than or equal to the pre-set distance, the length of the second time period may be set longer than the length of the first time period to more effectively identify whether there is contact of the object.

In the above-described example, the first finger 1 and the second finger 2 being driven based on the first distance between the first contact part 10 and the object and the second distance between the second contact part 20 and the object has been described.

However, the above is one example, and the processor 180 may control the driver 170 to drive the first finger 1 and the second finger 2 based on the object detected from the first image obtained through the first camera 120 and the object detected from the second image obtained through the second camera 150.

Specifically, the processor 180 may move the first finger 1 and the second finger 2 such that a size of the object detected from the first image and a size of the object detected from the second image are maintained to be same (or nearly same). Here, the size of the object detected from the first image and the size of the object detected from the second image being the same may refer to the first distance between the first contact part 10 and the object and the second distance between the second contact part 20 and the object being the same.

In addition, in the above-described example, the identifying whether the object has been contacted at the first contact part 10 and the second contact part 20 while repetitively performing the turning-on and turning-off of the first light emitter 110 and the second light emitter 140 has been described.

However, the above is merely one example, and the processor 180 may identify the first distance between the first contact part 10 and the object and the second distance between the second contact part 20 and the object while the first light emitter 110 and the second light emitter 140 are in the on state, and turn off the first light emitter 110 and the second light emitter 140 based on the identified first distance and second distance being less than or equal to the pre-set distance. Then, the processor 180 may use the first image obtained through the first camera 120 and the second image obtained through the second camera 150 and identify whether the object has been contacted at first contact part 10 and the second contact part 20 while the first light emitter 110 and the second light emitter 140 are in the off state.

In operation S420 in FIG. 4, the object may not be detected from the first image and the second image.

For example, if the first polarization filter 130 and the second polarization filter 160 are in the on state, black areas may be included in each of the first image and the second image. Here, if the surrounding of the robot 100 is dark, or if the color of the object is dark, the object may not be detected from each of the first image and the second image due to the black areas included in each of the first image and the second image.

Figure 9:
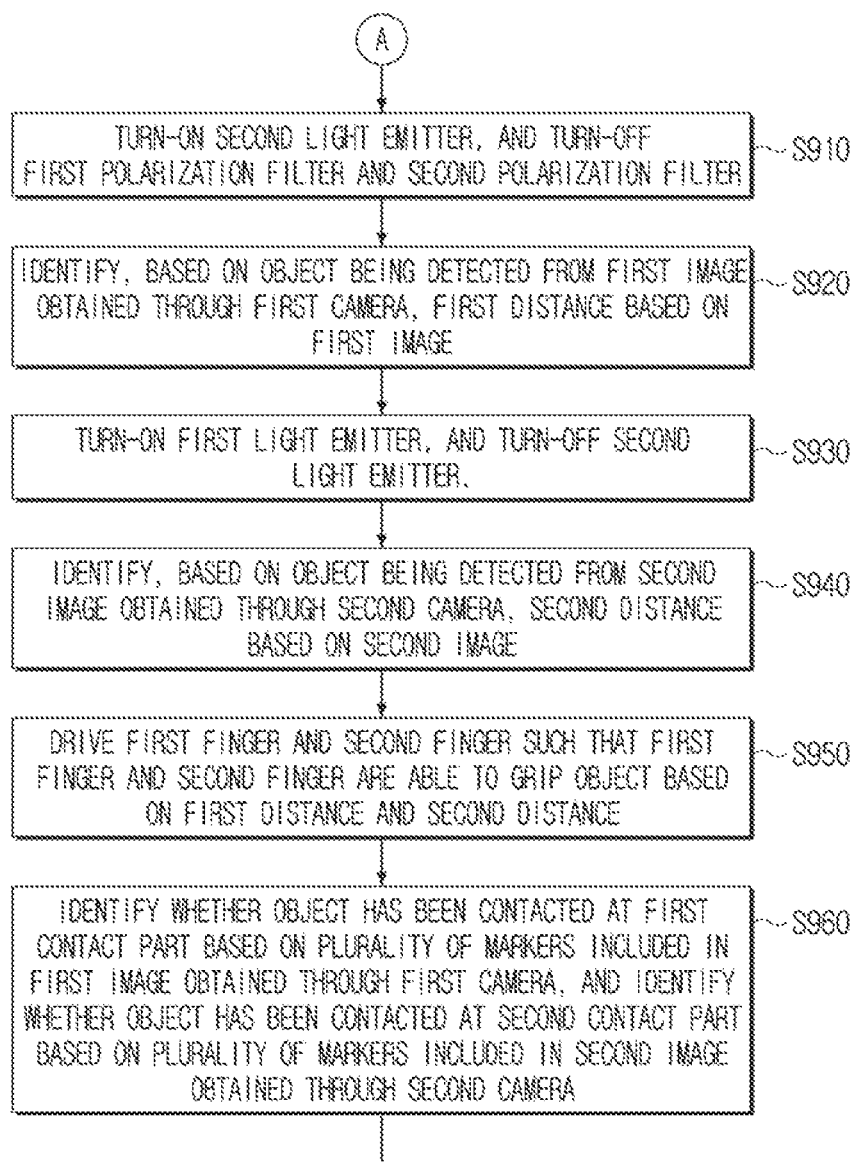

Referring to FIG. 9, the processor 180 may turn on, based on the object not being detected from the first image and the second image (S420-N), the second light emitter 140, and turn off the first polarization filter 130 and the second polarization filter 160 (S910). In this case, the first light emitter 110 may be in the off state.

Figure 10A:
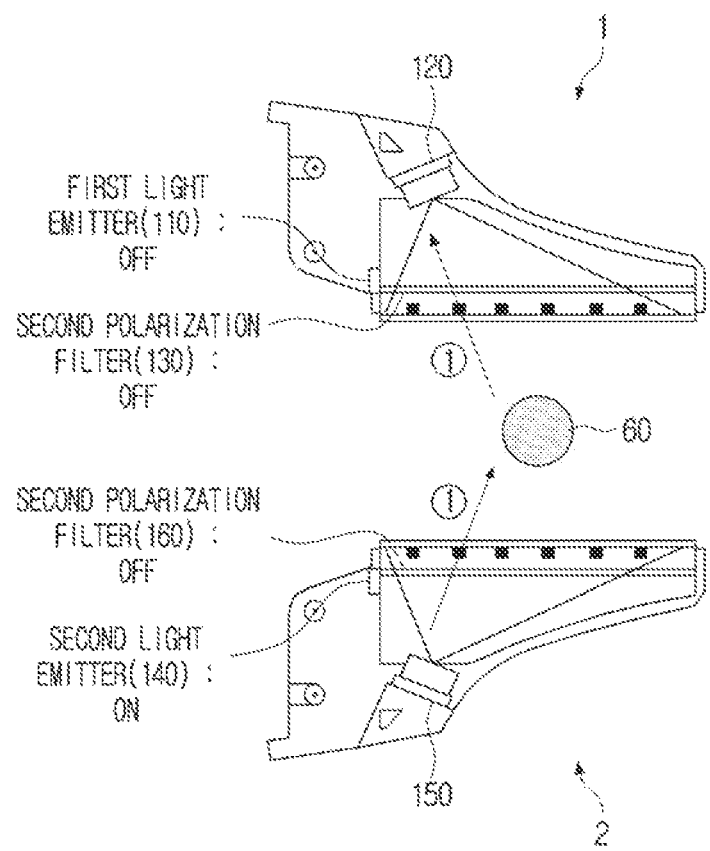

For example, referring to FIG. 10A, based on the first light emitter 110 being in a turned-off (i.e., deactivated) state, the first camera 120 may capture the outside of the first optical tactile sensor through the first contact part 10.

In this case, based on the first polarization filter 130 and the second polarization filter 160 being in the off state, the light output from the second light emitter 140 and transmitted through the second polarization filter 160 may not be blocked by the first polarization filter 130, and the light output from the second light emitter 140 may be reflected by an object 60 and introduced inside the first optical tactile sensor through the first contact part 10 (①) in FIG. 10A). That is, the light output from the second light emitter 140 may perform a role of an external lighting for the first camera 120. Accordingly, even if a space in which the robot 100 is positioned is dark, or the object is in a dark color, the processor 180 may detect the object from the first image captured by the first camera 120.

Then, the processor 180 may identify, based on the object being detected from the first image obtained through the first camera 120, the first distance based on the first image (S920). A method of detecting an object from an image and a method of identifying a distance based on an image may be same as that described above.

Then, the processor 180 may turn on the first light emitter 110, and turn off the second light emitter 140 (S930). In this case, the first polarization filter 130 and the second polarization filter 160 may be in the off state.

Figure 10B:
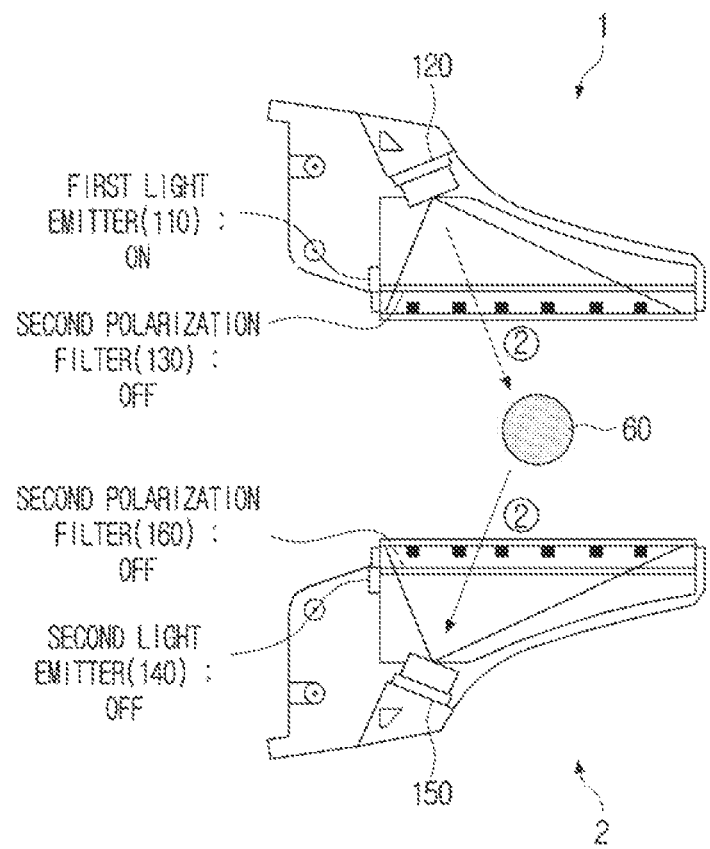

For example, referring to FIG. 10B, based on the second light emitter 140 being in the turned-off state, the second camera 150 may capture the outside of the second optical tactile sensor through the second contact part 20.

In this case, based on the first polarization filter 130 and the second polarization filter 160 being in the off state, light output from the first light emitter 110 and transmitted through the first polarization filter 130 may not be blocked by the second polarization filter 160, and the light output from the first light emitter 110 may be reflected by the object 60 and introduced inside the second optical tactile sensor through the second contact part 20 (②) in FIG. 10B). That is, the light output from the first light emitter 110 may perform the role of the external lighting for the second camera 150. Accordingly, even if the space in which the robot 100 is positioned is dark, or the object is in a dark color, the processor 180 may detect the object from the second image captured by the second camera 150. Then, the processor 180 may identify, based on the object being detected from the second image obtained through the second camera 150, the second distance based on the second image (S940). The method of detecting an object from the image and the method of identifying the distance based on the image may be same as that described above.

Then, the processor 180 may control the driver 170 such that the first finger 1 and the second finger are able to grip the object based on the first distance and the second distance (S950).

That is, the processor 180 may control the driver 170 for the first finger 1 and the second finger 2 to be respectively moved toward the direction at which the object is positioned while the difference of the first distance between the first contact part 10 and the object and the second distance between the second contact part 20 and the object is maintained within the pre-set range. In addition, the processor 180 may move the first finger 1 such that the object is positioned at a pre-set area in the first image captured through the first camera 120. In addition, the processor 180 may move the second finger 2 such that the object is positioned at the pre-set area in the second image captured through the second camera 150.

The method of driving the first finger 1 and the second finger 2 is same as that described above.

Further, the processor 180 may identify whether the object has been contacted at the first contact part 10 based on the plurality of markers included in the first image obtained through the first camera 120, and identify whether the object has been contacted at the second contact part 20 based on the plurality of markers included in the second image obtained through the second camera 150 (S960).

Specifically, the processor 180 may obtain the first image through the first camera 120 while the first light emitter 110 is in the on state, and the second light emitter 140 is in the off state. Then, the processor 180 may identify whether at least one from among the plurality of markers 12 included in the first image has been moved, and identify whether the object has been contacted at the first contact part 10. That is, based on the plurality of markers 12 of the first contact part 10 being captured (or clearly captured) through the first camera 120 when the first light emitter 110 is in the on state, the processor 180 may obtain the first image in which the plurality of markers 12 are captured through the first camera 120 while the first light emitter 110 is in the on state.

In addition, the processor 180 may obtain the second image through the second camera 150 while the first light emitter 110 is in the on state, and the second light emitter 140 is in the off state. Then, the processor 180 may identify whether at least one from among the plurality of markers 22 included in the second image has been moved, and identify whether the object has been contacted at the second contact part 20. That is, based on the plurality of markers 22 of the second contact part 20 being captured (or clearly captured) through the second camera 150 when the second light emitter 140 is in the on state, the processor 180 may obtain the second image in which the plurality of markers 22 are captured through the second camera 150 while the second light emitter 140 is in the on state. The method of determining whether the object has contacted the contact part is same as that described above.

The processor 180 may turn on, based on the object being identified as not having been contacted at the first contact part 10 and the second contact part 20, the first light emitter 110 and the second light emitter 140 alternately, and identify whether the object has been contacted at the first contact part 10 and the second contact part 20 by repeating the above-described operation.

As described above, the processor 180 may repetitively perform the above-described operation until the object is identified as having contacted at the first contact part 10 and the second contact part 20.

In the above-described example, the processor 180 may turn on, based on the object not being detected from the first image and the second image obtained for a certain time period through the first camera 120 and the second camera 150, the first polarization filter 130 and the second polarization filter 160. Then, the processor 180 may detect the object using the method described in FIG. 4.

If the size of the object is greater than a sensing range of the optical tactile sensor (e.g., the size of the first contact part 10 and the second contact part 20), the object may not be detected in operation S420 in FIG. 4.

Even in this case, the processor 180 may alternately turn on the first light emitter 110 and the second light emitter 140 while maintaining the first polarization filter 130 and the second polarization filter 160 in the off state same as that described in FIG. 9.

Then, the processor 180 may control the driver 170 such that the first finger 1 and the second finger 2 are able to grip the object based on light output from the optical tactile sensor.

Specifically, based on the first light emitter 110 and the second light emitter 140 being alternately turned on, the remaining light emitters may be in the off state while one light emitter from among the light emitters is in the on state.

In this case, based on the contact part being wholly covered by the object when viewing the optical tactile sensor opposite from the camera of the optical tactile sensor disposed with the light emitter in the off state, the camera may not receive light output from the light emitter of the opposite optical tactile sensor. In addition, if a portion of the contact part is covered by the object, a portion from among the light output from the light emitter of the opposite optical tactile sensor may be blocked by the object, but a portion may be received from the image sensor of the camera Here, an area of the contact part covered by the object may be an area at which the object is contacted at the first contact part 10 and the second contact part 20 when the first finger 1 and the second finger 2 are respectively moved toward the direction at which the object is positioned. The robot 100 may not be able to stably grip the object using the first contact part 10 and the second contact part 20 if a size of an area to be contacted is small based on gripping the object through the area to be contacted.

Accordingly, the processor 180 may identify an area in which a brightness value is greater than or equal to a pre-set value from the image captured by the camera of the optical tactile sensor disposed with the light emitter in the off state. Here, the area in which the brightness value is greater than or equal to the pre-set value may correspond to an area of the contact part not covered by the object.

Then, the processor 180 may move the first finger 1 and the second finger 2 through the driver 170 such that a ratio of the area in which the brightness value is greater than or equal to the pre-set value becomes less than or equal to the pre-set value in the image captured through the camera.

Figure 11:
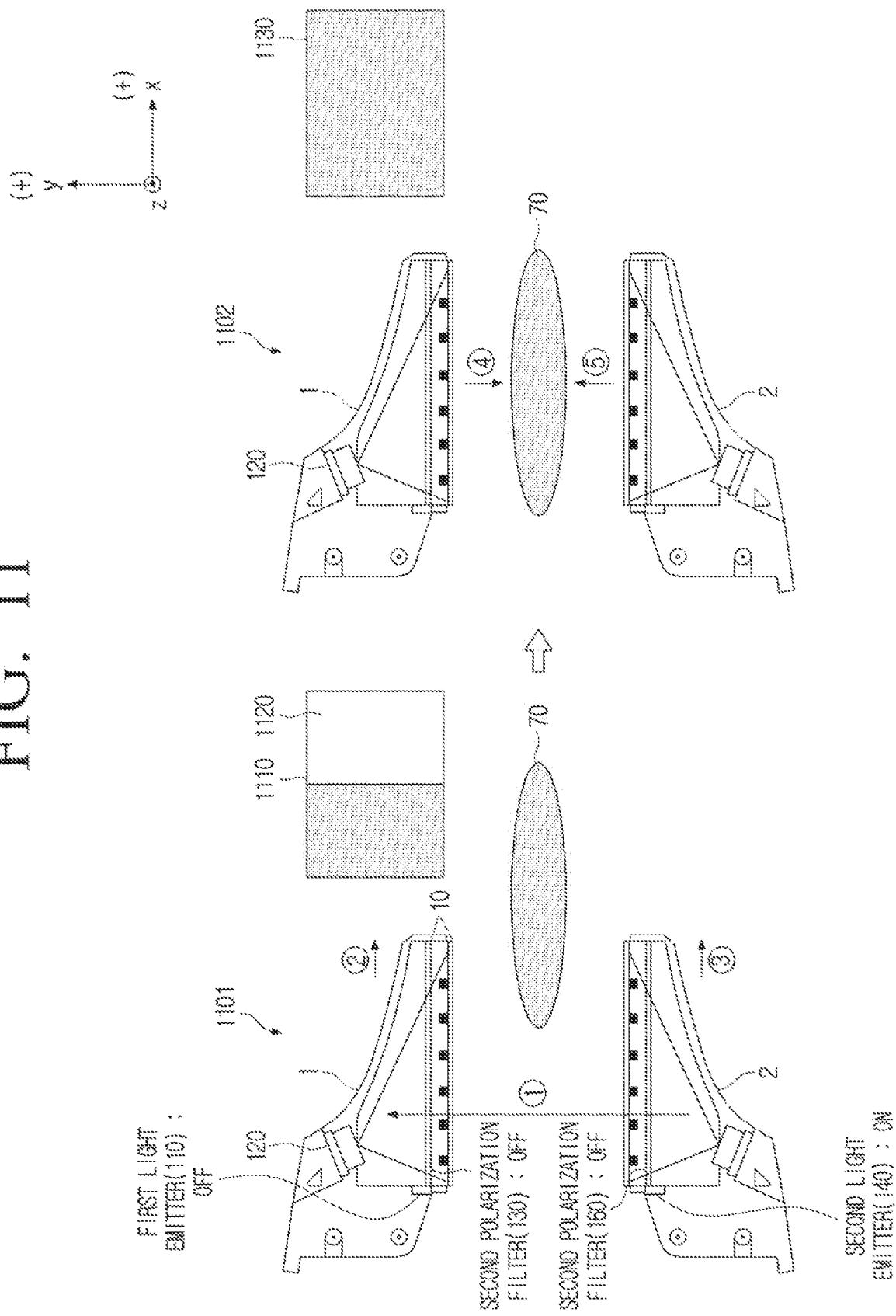

According to an example, referring to 1101 in FIG. 11, based on the first light emitter 110 being in the turned-off state, the first camera 120 may capture the outside of the first optical tactile sensor through the first contact part 10.

In this case, based on the first polarization filter 130 and the second polarization filter 160 being in the off state, light output from the second light emitter 140 and transmitted through the second polarization filter 160 may not be blocked by the first polarization filter 130. However, based on a portion of the first contact part 10 being covered by the object 70, a portion from among the light output from the second light emitter 140 may be blocked by the object 70, and a portion may be received in the first camera 120 (① in FIG. 11).

The processor 180 may identify an area 1120 in which the brightness value is greater than or equal to the pre-set value in a first image 1110 captured through the first camera 120, and identify a ratio constituted by the identified area 1120 in the first image 1110. Then, the processor 180 may move, based on the identified ratio being greater than or equal to the pre-set value, the first finger 1 and the second finger 2 such that the ratio of the area in which the brightness value is greater than or equal to the pre-set value becomes less than or equal to the pre-set value.

In this case, the processor 180 may move the first finger 1 and the second finger 2 based on the position of the area 1120 in the first image 1110.

For example, as with ② and ③ in FIG. 11, the processor 180 may control the driver 170 to move the first finger 1 and the second finger 2 toward an opposite direction (i.e., (+) direction of x-axis) of the direction at which the area 1120 is positioned in the first image 1110.

Then, as with 1102 in FIG. 11, the processor 180 may control the driver 170 for the first finger 1 and the second finger 2 to be stopped when the ratio of the area in which the brightness value is greater than or equal to the pre-set value becomes less than or equal to the pre-set value in a first image 1130. For example, the processor 180 may stop the first finger 1 and the second finger 2 when the area in which the brightness value is greater than or equal to the pre-set value is not identified from the first image 1130. Then, the processor 180 may control the driver 170 such that the first finger 1 and the second finger 2 are respectively moved toward the direction at which the object is positioned and configured to grip the object ④ and ⑤ in FIG. 11).

In the above-described embodiments, the processor 180 may move the first finger 1 and the second finger 2 toward the direction at which the object is positioned, respectively.

Then, the processor 180 may identify whether the object has been contacted at the first contact part 10 based on the plurality of markers included in the first image obtained through the first camera 120, and identify whether the object has been contacted at the second contact part 20 based on the plurality of markers included in the second image obtained through the second camera 150.

Figure 12:
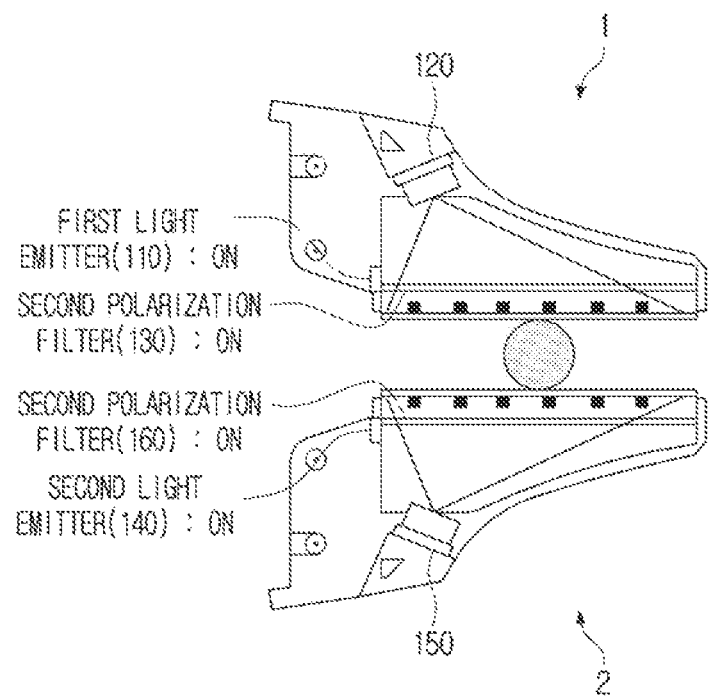
FIG. 12 is a diagram illustrating an example of an object being contacted at a first contact part and a second contact part according to one or more embodiments.

In this case, as in FIG. 12, the processor 180 may turn on, based on the object being identified as having been contacted at the first contact part 10 and the second contact part 20, the first light emitter 110, the second light emitter 140, the first polarization filter 130, and the second polarization filter 160. In this case, the processor 180 may maintain the on state of elements currently in the on state from among the elements above, and turn-on (i.e., activate) the element that is currently in the off state (i.e., deactivated state).

The turning-on the first light emitter 110 may be for capturing the plurality of markers 12 of the first contact part 10 through the first camera 120, and the turning-on the second light emitter 140 may be for capturing the plurality of markers 22 of the second contact part 20 through the second camera 150. In addition, the turning-on the first polarization filter 130 and the second polarization filter 160 may be for preventing the second camera 150 from receiving interference by the light output from the first light emitter 110, and for preventing the first camera 120 from receiving interference by the light output from the second light emitter 140.

The processor 180 may identify movement of at least one from among the plurality of markers 12 of the first contact part 10 based on the first image obtained through the first camera 120, and identify movement of at least one from among the plurality of markers 22 of the second contact part 20 based on the second image obtained through the second camera 150.

Specifically, the processor 180 may identify at least one marker, the position of which is moved, from among the plurality of markers 12 of the first contact part 10 based on the first image, and identify a direction to which the corresponding marker moved, a moving distance, and the like. In addition, the processor 180 may identify at least one marker, the position of which is moved, from among the plurality of markers 22 of the second contact part 20 based on the second image, and identify the direction to which the corresponding marker moved, the moving distance, and the like.

Then, the processor 180 may identify an intensity of force applied to the first contact part 10 and the second contact part 20 based on the marker, the position of which was moved.

To this end, information about the intensity of force applied to the first contact part 10 and the second contact part 20 according to a moving direction and the moving distance of the marker may be pre-stored in the memory 190. In this case, information about the intensity of force may be experimentally measured.

Accordingly, the processor 180 may use the information stored in the memory 190 and determine the intensity of force applied to the first contact part 10 and the second contact part 20.

According to one or more embodiments, the robot 100 may detect the object to be gripped, and then move to the object, and at this time, the robot 100 may use a light emitter provided at one optical tactile sensor as the external lighting for another optical tactile sensor to detect the object to be gripped by the robot 100.

Specifically, the processor 180 may control the driver 170 such that the first finger 1 and the second finger 2 are rotated in the first direction by a certain angle, and control the driver 170 such that the second finger 2 is rotated in the second direction opposite to the first direction by a certain angle.

Here, the first direction may be an anti-clockwise direction, and the second direction may be a clockwise direction. Alternatively, the first direction may be the clockwise direction, and the second direction may be the anti-clockwise direction.

Accordingly, the first finger 1 and the second finger 2 may be disposed such that an angle between the first finger 1 and the second finger 2 becomes a pre-set angle. In this case, the pre-set angle may be greater than or equal to 90 degrees.

Figure 13:
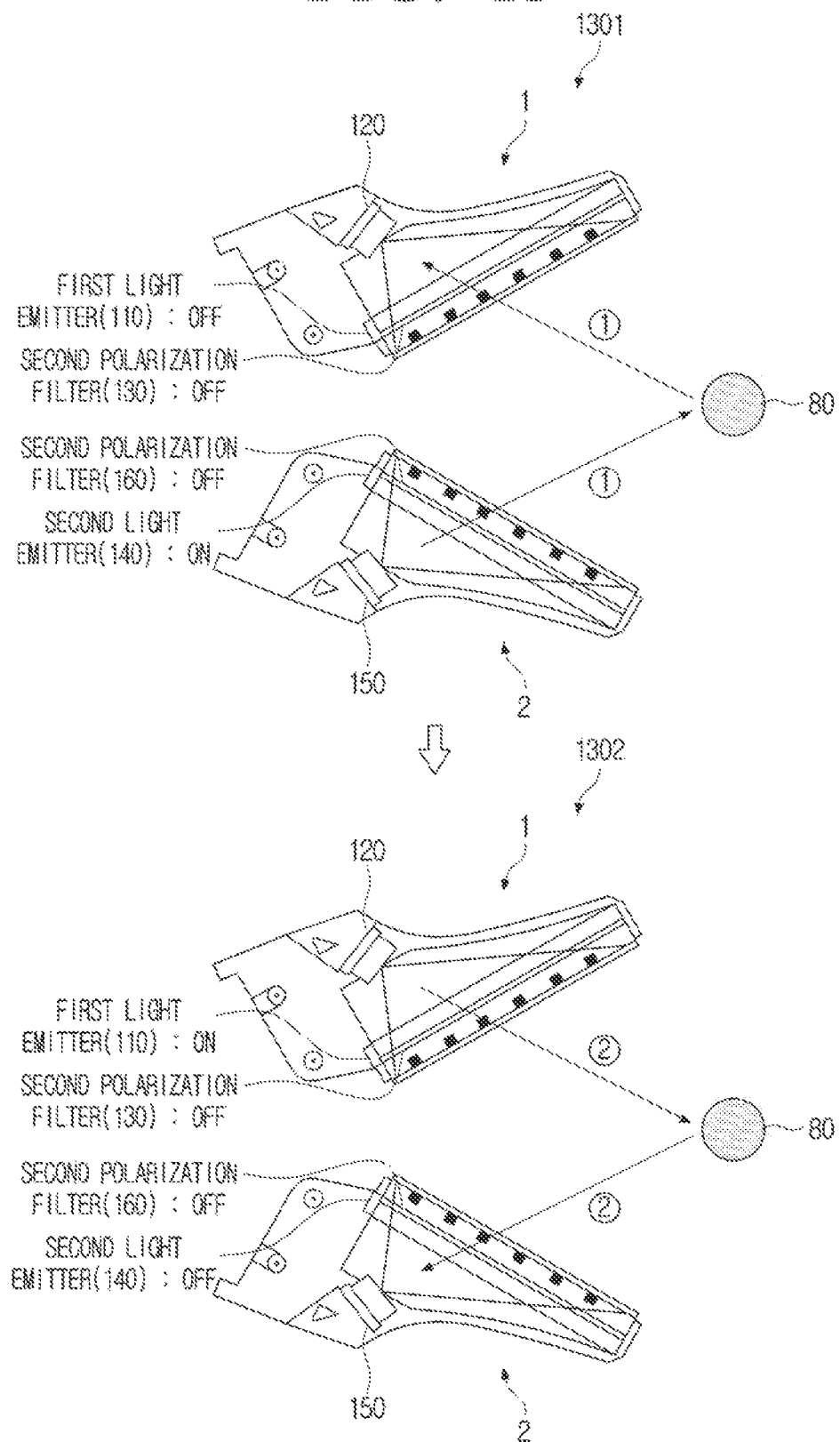
FIG. 13 is a diagram illustrating a method of detecting an object to be gripped by a robot according to one or more embodiments.

Then, referring to 1301 in FIG. 13, the processor 180 may turn off the first light emitter 110, and turn on the second light emitter 140. In addition, the processor 180 may turn off the first polarization filter 130 and the second polarization filter 160.

In this case, based on the first light emitter 110 being in the turned-off state, the first camera 120 may capture the outside of the first optical tactile sensor through the first contact part 10.

In addition, based on the first polarization filter 130 and the second polarization filter 160 being in the off state, light output from the second light emitter 140 and transmitted through the second polarization filter 160 may not be blocked by the first polarization filter 130, and the light output from the second light emitter 140 may be reflected by an object 80 and introduced inside the first optical tactile sensor through the first contact part 10 (① of 1301 in FIG. 13). That is, the light output from the second light emitter 140 may perform the role of the external lighting for the first camera 120. Then, the processor 180 may capture the first image through the first camera 120.

Then, referring to 1302 in FIG. 13, the processor 180 may turn on the first light emitter 110, and turn off the second light emitter 140. The first polarization filter 130 and the second polarization filter 160 may be in the off state.

In this case, based on the second light emitter 140 being in the turned-off state, the second camera 150 may capture the outside of the second optical tactile sensor through the second contact part 20.

In addition, based on the first polarization filter 130 and the second polarization filter 160 being in the off state, light output from the first light emitter 110 and transmitted through the first polarization filter 130 may not be blocked by the second polarization filter 160, and the light output from the first light emitter 110 may be reflected by the object 80 and introduced inside the second optical tactile sensor through the second contact part 20 (② of 1302 in FIG. 13). That is, the light output from the first light emitter 110 may perform the role of the external lighting for the second camera 150. Then, the processor 180 may capture the second image through the second camera 150.

The processor 180 may detect the object from the first image obtained through the first camera 120 and from the second image obtained through the second camera 150. In this case, the detected object may be a target object to be gripped by the robot 100.

Then, the processor 180 may control the driver 170 to move the first finger 1 and the second finger 2 based on the position of the object. Specifically, the processor 180 may move the first finger 1 and the second finger 2 such that the object is positioned between the first finger 1 and the second finger 2.

As described above, the robot 100 may grip, based on the object being positioned between the first finger 1 and the second finger 2, the object using the first finger 1 and the second finger 2 by performing a grip operation as described above.

According to the one or more embodiments described above, in order to grip the object using the first finger 1 and the second finger 2, the object between the first finger 1 and the second finger 2 may be detected without interference by the light output from the optical tactile sensor disposed at an opposite finger even if the first finger 1 and the second finger 2 are disposed to face each other, and accordingly, the object may be gripped.

In the above-described example, the first finger 1 and the second finger 2 have been described as being moved to position the object between the first finger 1 and the second finger 2. However, the above is one example, and the processor 180 may move the robot 100 provided with the first finger 1 and the second finger 2. To this end, the robot 100 may include a plurality of wheels and a driver for driving the plurality of wheels. Alternatively, the processor 180 may move a hand of the robot 100 provided with the first finger 1 and the second finger 2. To this end, the robot 100 may include a driver for driving the hand. In these cases, the driver may include a motor, an actuator, a gear, and the like.

Figure 14:
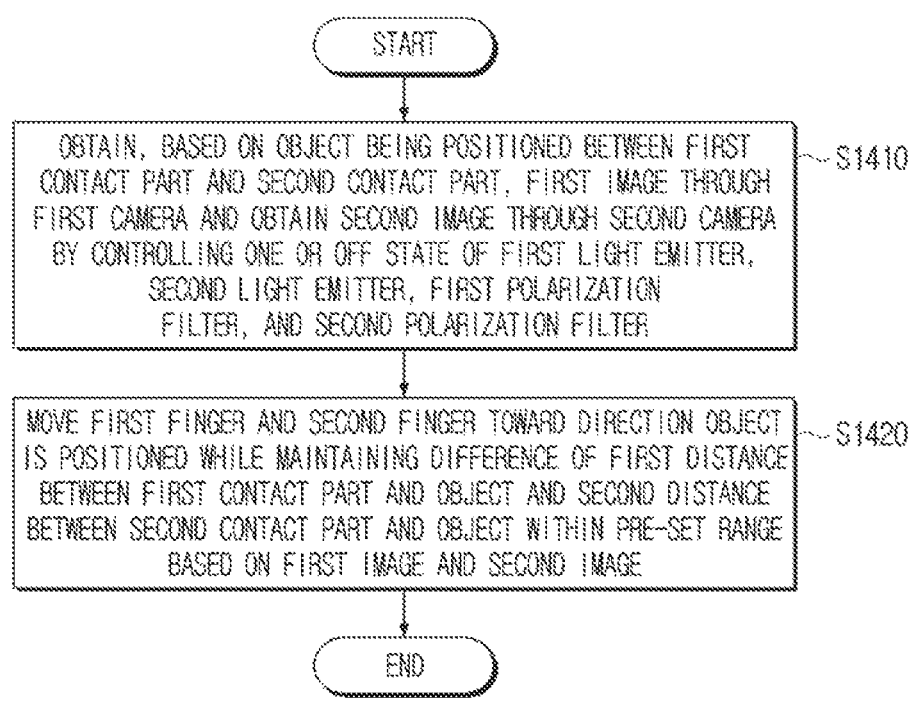
FIG. 14 is a flowchart illustrating an object grip method of a robot according to one or more embodiments.

FIG. 14 is a flowchart illustrating an object grip method of a robot according to one or more embodiments.

Here, the robot may include the first finger formed with the first contact part and the second finger formed with the second contact part.

Further, the robot may include the first light emitter provided at the first finger, the first camera provided at the first finger and configured to capture the direction at which the first contact part is positioned, the first polarization filter configured to pass the polarized light in the first direction from among the light output from the first light emitter according to the voltage applied or the light output from the first light emitter and provide to the first contact part, the second light emitter provided at the second finger, the second camera provided at the second finger and configured to capture the direction at which the second contact part is positioned, and the second polarization filter configured to pass the polarized light in the second direction which is perpendicular with the first direction from among the light output from the second light emitter according to the voltage applied or the light output from the second light emitter and provide to the second contact part.

The object grip method may include obtaining the first image through the first camera, and obtaining the second image through the second camera by controlling the on or off state of the first light emitter, the second light emitter, the first polarization filter, and the second polarization filter based on the object being positioned between the first contact part and the second contact part (S1410).

Then, the first finger and the second finger may be moved toward the direction at which the object is positioned while maintaining the difference of the first distance between the first contact part and the object and the second distance between the second contact part and the object within the pre-set range based on the first image and the second image (S1420).

Here, the first contact part may include a first gel including the plurality of markers and a first coating layer formed on the first gel. In addition, the second contact part may include a second gel including the plurality of markers and a second coating layer formed on the second gel.

Here, the first coating layer and the second coating layer may be transparent or semi-transparent.

In addition, in operation S1410, the first light emitter and the second light emitter may be turned off, and the first polarization filter and the second polarization filter may be turned on. In this case, in operation S1420, if the object is detected from the first image obtained through the first camera and from the second image obtained through the second camera, the first distance may be identified based on the first image and the second distance may be identified based on the second image, and the first finger and the second finger may be moved based on the first distance and the second distance.

In addition, in operation S1410, the first light emitter and the second light emitter may be turned on. In this case, in operation S1420, whether the object has been contacted at the first contact part may be identified based on the plurality of markers included in the first image obtained through the first camera, and whether the object has been contacted at the second contact part may be identified based on the plurality of markers included in the second image obtained through the second camera.

In addition, in operation S1410, based on the first distance and the second distance being less than or equal to the pre-set distance, the first light emitter and the second light emitter may be turned off for the first time period, and the first light emitter and the second light emitter may be turned on for the second time period which is longer than the first time period.

In addition, in operation S1410, if the object is not detected from the first image and the second image, the second light emitter may be turned on, the first polarization filter and the second polarization filter may be turned off, the first light emitter may be turned on, and the second light emitter may be turned off. In this case, in operation S1420, if the object is detected from the first image obtained through the first camera while the second light emitter is in the on state and the first polarization filter and the second polarization filter are in the off state, the first distance may be identified based on the first image, and if the object is detected from the second image obtained through the second camera while the first light emitter is in the off state, and the first polarization filter and the second polarization filter are in the off state, the second distance may be identified based on the second image, and the first finger and the second finger may be moved based on the first distance and the second distance.

In addition, in operation S1410, the first image may be obtained through the first camera while the first light emitter is in the on state and the second light emitter is in the off state, and the second image may be obtained through the second camera while the first light emitter is in the off state and the first second emitter is in the on state. In this case, in operation S1420, whether the object has been contacted at the first contact part may be identified based on the plurality of markers included in the first image, and whether the object has been contacted at the second contact part may be identified based on the plurality of markers included in the second image.

According to one or more embodiments of the disclosure, the various example embodiments described herein may be realized with software including instructions stored in a machine-readable storage media (e.g., computer). The machine may call a stored instruction from the storage medium, and as an apparatus operable according to the called instruction, may include an electronic apparatus (e.g., electronic apparatus 100) according to the above-mentioned embodiments. Based on the instruction being executed by the processor, the processor may directly or using other elements under the control of the processor perform a function corresponding to the instruction. The instruction may include a code generated by a compiler or executed by an interpreter. The machine-readable storage medium may be provided in the form of a non-transitory storage medium. Herein, "non-transitory" merely means that the storage medium is tangible and does not include a signal, and the term does not differentiate data being semi-permanently stored or being temporarily stored in the storage medium.

In addition, according to one or more embodiments, a method according to the one or more embodiments described above may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be stored at least temporarily in the storage medium such as a server of a manufacturer, a server of an application store, or a memory of a relay server, or temporarily generated.

According to one or more embodiments of the disclosure, the various embodiments described above may be realized in a recording medium which is readable by a computer or a device similar to the computer using software, hardware, or the combination thereof. In some cases, the embodiments described herein may be realized by the processor on its own. According to a software implementation, embodiments such as the procedures and functions described herein may be realized as a separate software. Each software may perform one or more functions and operations described herein.

Computer instructions for performing processing operations in the device according to one or more embodiments described herein may be stored in a non-transitory computer-readable medium. The computer instructions stored in this non-transitory computer-readable medium may cause a specific device to perform a processing operation in a device according to the above-described embodiments when executed by a processor of the specific device. The non-transitory computer readable medium may refer to a medium that stores data semi-permanently rather than storing data for a very short time, such as a register, a cache, a memory, or the like, and is readable by a device. Specific examples of the non-transitory computer readable medium may include, for example, and without limitation, a compact disc (CD), a digital versatile disc (DVD), a hard disc, a Blu-ray disc, a USB, a memory card, a ROM, and the like.

In addition, respective elements (e.g., a module or a program) according to various embodiments described above may be formed of a single entity or a plurality of entities, and some sub-elements of the above-mentioned sub-elements may be omitted or other sub-elements may be further included in the various embodiments. Alternatively or additionally, some elements (e.g., modules or programs) may be integrated into one entity to perform the same or similar functions performed by the respective corresponding elements prior to integration. Operations performed by a module, a program, or another element, in accordance with the various embodiments, may be executed sequentially, in parallel, repetitively, or in a heuristically manner, or at least some operations may be performed in a different order, omitted, or a different operation may be added.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:
1. A robot comprising:
   a first finger comprising:
     a first contact part;
     a first light emitter configured to radiate light toward the first contact part;

a first camera configured to capture an image in a direction corresponding to a location of the first contact part; and a first polarization filter between the first light emitter and the first contact part, wherein the first polarization filter is configured to pass light polarized in a first direction, from among the light radiated by the first light emitter, to the first contact part based on a voltage applied to the first polarization filter;

a second finger comprising:
  a second contact part;
  a second light emitter configured to radiate light toward the second contact part;
  a second camera configured to capture an image in a direction corresponding to a location of the second contact part; and
  a second polarization filter interposed between the second light emitter and the second contact part, wherein the second polarization filter is configured to pass light polarized in a second direction, from among the light radiated by the second light emitter, to the second contact part based on a voltage applied to the second polarization filter, and wherein the second direction is perpendicular to the first direction;

a driver configured to cause the first finger and the second finger to move; and at least one processor operatively connected with the first light emitter, the first camera, the first polarization filter, the second light emitter, the second camera, the second polarization filter, and the driver, wherein the at least one processor is configured to:
  obtain a first image through the first camera and a second image through the second camera by controlling an activation state of at least one of the first light emitter, the second light emitter, the first polarization filter, and the second polarization filter, and
  based on identifying the presence of an object positioned between the first contact part and the second contact part based on the first image and the second image, control the driver to cause the first finger and the second finger to grip the object and to maintain within a pre-set range, based on the first image and the second image, a difference between a first distance and a second distance, and wherein the first distance is a distance between the first contact part and the object and the second distance is a distance between the second contact part and the object.

2. The robot of claim 1, wherein the first contact part comprises a first gel comprising a first plurality of markers and a first coating layer formed on the first gel, and
  the second contact part comprises a second gel comprising a second plurality of markers and a second coating layer formed on the second gel.

3. The robot of claim 2, wherein the first coating layer and the second coating layer are transparent or semi-transparent.

4. The robot of claim 1, wherein the at least one processor is further configured to:
  identify whether the first light emitter and the second light emitter are deactivated, and based on identifying that the first light emitter and the second light emitter are not deactivated, deactivate the first light emitter and the second light emitter,
  identify whether the first polarization filter and the second polarization filter are activated, and based on identifying that the first polarization filter and the second polarization filter are not activated, activate the first polarization filter and the second polarization filter, and
  based on identifying the presence of the object positioned between the first contact part and the second contact part based on the first image and the second image, identify the first distance based on the first image, identify the second distance based on the second image, and control the driver to cause the first finger and the second finger to grip the object based on the first distance and the second distance.

5. The robot of claim 4, wherein the first contact part comprises a first plurality of markers and the second contact part comprises a second plurality of markers, and
  wherein the at least one processor is further configured to:
    based on the first light emitter and the second light emitter being deactivated, activate the first light emitter and the second light emitter,
    identify whether the object has been contacted by the first contact part based on a position of the first plurality of markers in the first image, and
    identify whether the object has been contacted by the second contact part based on a position of the second plurality of markers in the second image.

6. The robot of claim 5, wherein the at least one processor is further configured to:
  based on the first distance and the second distance being less than or equal to a pre-set distance, deactivate the first light emitter and the second light emitter for a first time period, and activate the first light emitter and the second light emitter for a second time period which is longer than the first time period.

7. The robot of claim 4, wherein the at least one processor is further configured to, based on not identifying the presence of the object positioned between the first contact part and the second contact part based on the first image and the second image:
  activate the second light emitter and deactivate the first polarization filter and the second polarization filter, and based on identifying the presence of the object based on the first image while the second light emitter is activated and the first polarization filter and the second polarization filter are deactivated, identify the first distance based on the first image,
  activate the first light emitter and deactivate the second light emitter, and based on identifying the presence of the object based on the second image while the first light emitter is activated, the second light emitter is deactivated and the first polarization filter and the second polarization filter are deactivated, identify the second distance based on the second image, and
  control the driver to cause the first finger and the second finger to grip the object based on the first distance and the second distance.

8. The robot of claim 7, wherein the first contact part comprises a first plurality of markers and the second contact part comprises a second plurality of markers, and
  wherein the at least one processor is further configured to:
    obtain the first image through the first camera while the first light emitter is activated and the second light emitter is deactivated, and identify whether the object has been contacted by the first contact part based on a position of the first plurality of markers in the first image, and
    obtain the second image through the second camera while the first light emitter is deactivated and the first light emitter is activated, and identify whether the object has been contacted by the second contact part based on a position of the second plurality of markers in the second image.

9. A method of controlling a robot comprising a first finger and a second finger, the method comprising:
- obtaining a first image through a first camera of the first finger and a second image through a second camera of the second finger by controlling an activation state of at least one of a first light emitter of the first finger, a first polarization filter of the first finger, a second light emitter of the second finger, and a second polarization filter of the second finger, and
- based on identifying the presence of an object positioned between a first contact part of the first finger and a second contact part of the second finger based on the first image and the second image, causing the first finger and the second finger to move toward a location at which the object is positioned while maintaining a difference between a first distance and a second distance within a pre-set range based on the first image and the second image,
- wherein the first distance is a distance between the first contact part and the object and the second distance is a distance between the second contact part and the object.

10. The method of claim 9,
wherein the obtaining further comprises:
- identifying whether the first light emitter and the second light emitter are deactivated, and based on identifying that the first light emitter and the second light emitter are not deactivated, deactivating the first light emitter and the second light emitter,
- identifying whether the first polarization filter and the second polarization filter are activated, and
- based on identifying that the first polarization filter and the second polarization filter are not activated, activating the first polarization filter and the second polarization filter, and
wherein the causing the first finger and the second finger to move further comprises:
- based on identifying the presence of the object positioned between the first contact part and the second contact part based on the first image and the second image, identifying the first distance based on the first image, identifying the second distance based on the second image, and causing the first finger and the second finger to move based on the first distance and the second distance.

11. The method of claim 10,
wherein the obtaining further comprises:
- based on the first light emitter and the second light emitter being deactivated, activating the first light emitter and the second light emitter, and
wherein the causing the first finger and the second finger to move further comprises:
- identifying whether the object has been contacted by the first contact part based on a position in the first image of a first plurality of markers on the first contact part, and
- identifying whether the object has been contacted by the second contact part based on a position in the second image of a second plurality of markers on the second contact part.

12. The method of claim 11, wherein the obtaining further comprises:
- based on the first distance and the second distance being less than or equal to a pre-set distance, deactivating the first light emitter and the second light emitter for a first time period, and activating the first light emitter and the second light emitter for a second time period which is longer than the first time period.

13. The method of claim 10,
wherein, based on not identifying the presence of the object positioned between the first contact part and the second contact part based on the first image and the second image,
the obtaining further comprises:
- activating the second light emitter and deactivating the first polarization filter and the second polarization filter, and based on identifying the presence of the object based on the first image while the second light emitter is activated and the first polarization filter and the second polarization filter are deactivated, identifying the first distance based on the first image; and
- activating the first light emitter and deactivating the second light emitter, and based on identifying the presence of the object based on the second image while the first light emitter is activated, the second light emitter is deactivated and the first polarization filter and the second polarization filter are deactivated, identifying the second distance based on the second image, and
the causing the first finger and the second finger to move further comprises moving the first finger and the second finger based on the first distance and the second distance.

14. The method of claim 13, wherein the obtaining further comprises:
- obtaining the first image through the first camera while the first light emitter is activated and the second light emitter is deactivated, and identifying whether the object has been contacted by the first contact part based on a position in the first image of a first plurality of markers on the first contact part, and
- obtaining the second image through the second camera while the first light emitter is deactivated and the first light emitter is activated, and identifying whether the object has been contacted by the second contact part based on a position in the second image of a second plurality of markers on the second contact part.

15. A non-transitory computer readable medium having instructions stored therein, which when executed by at least one processor cause the at least one processor to execute a method of controlling a robot comprising a first finger and a second finger, the method comprising:
- obtaining a first image through a first camera of the first finger and a second image through a second camera of the second finger by controlling an activation state of at least one of a first light emitter of the first finger, a first polarization filter of the first finger, a second light emitter of the second finger, and a second polarization filter of the second finger, and
- based on identifying the presence of an object positioned between a first contact part of the first finger and a second contact part of the second finger based on the first image and the second image, causing the first finger and the second finger to move toward a location at which the object is positioned while maintaining a difference between a first distance and a second distance within a pre-set range based on the first image and the second image, wherein the first distance is a distance between the first contact part and the object and the second distance is a distance between the second contact part and the object.

16. The non-transitory computer readable medium of claim 15,
wherein the obtaining further comprises:
identifying whether the first light emitter and the second light emitter are deactivated, and based on identifying that the first light emitter and the second light emitter are not deactivated, deactivating the first light emitter and the second light emitter,
identifying whether the first polarization filter and the second polarization filter are activated, and
based on identifying that the first polarization filter and the second polarization filter are not activated, activating the first polarization filter and the second polarization filter, and
wherein the causing the first finger and the second finger to move further comprises:
based on identifying the presence of the object positioned between the first contact part and the second contact part based on the first image and the second image, identifying the first distance based on the first image, identifying the second distance based on the second image, and causing the first finger and the second finger to move based on the first distance and the second distance.

17. The non-transitory computer readable medium of claim 16, wherein the obtaining further comprises:
based on the first light emitter and the second light emitter being deactivated, activating the first light emitter and the second light emitter, and
wherein the causing the first finger and the second finger to move further comprises:
identifying whether the object has been contacted by the first contact part based on a position in the first image of a first plurality of markers on the first contact part, and
identifying whether the object has been contacted by the second contact part based on a position in the second image of a second plurality of markers on the second contact part.

18. The non-transitory computer readable medium of claim 17, wherein the obtaining further comprises:
based on the first distance and the second distance being less than or equal to a pre-set distance, deactivating the first light emitter and the second light emitter for a first time period, and activating the first light emitter and the second light emitter for a second time period which is longer than the first time period.

19. The non-transitory computer readable medium of claim 16,
wherein, based on not identifying the presence of the object positioned between the first contact part and the second contact part based on the first image and the second image,
the obtaining further comprises:
activating the second light emitter and deactivating the first polarization filter and the second polarization filter, and based on identifying the presence of the object based on the first image while the second light emitter is activated and the first polarization filter and the second polarization filter are deactivated, identifying the first distance based on the first image; and
activating the first light emitter and deactivating the second light emitter, and based on identifying the presence of the object based on the second image while the first light emitter is activated, the second light emitter is deactivated and the first polarization filter and the second polarization filter are deactivated, identifying the second distance based on the second image, and
the causing the first finger and the second finger to move further comprises moving the first finger and the second finger based on the first distance and the second distance.

20. The non-transitory computer readable medium of claim 19, wherein the obtaining further comprises:
obtaining the first image through the first camera while the first light emitter is activated and the second light emitter is deactivated, and identifying whether the object has been contacted by the first contact part based on a position in the first image of a first plurality of markers on the first contact part, and
obtaining the second image through the second camera while the first light emitter is deactivated and the first light emitter is activated, and identifying whether the object has been contacted by the second contact part based on a position in the second image of a second plurality of markers on the second contact part.

* * * * *